Sept. 12, 1967          L. S. GAGE ETAL          3,340,904

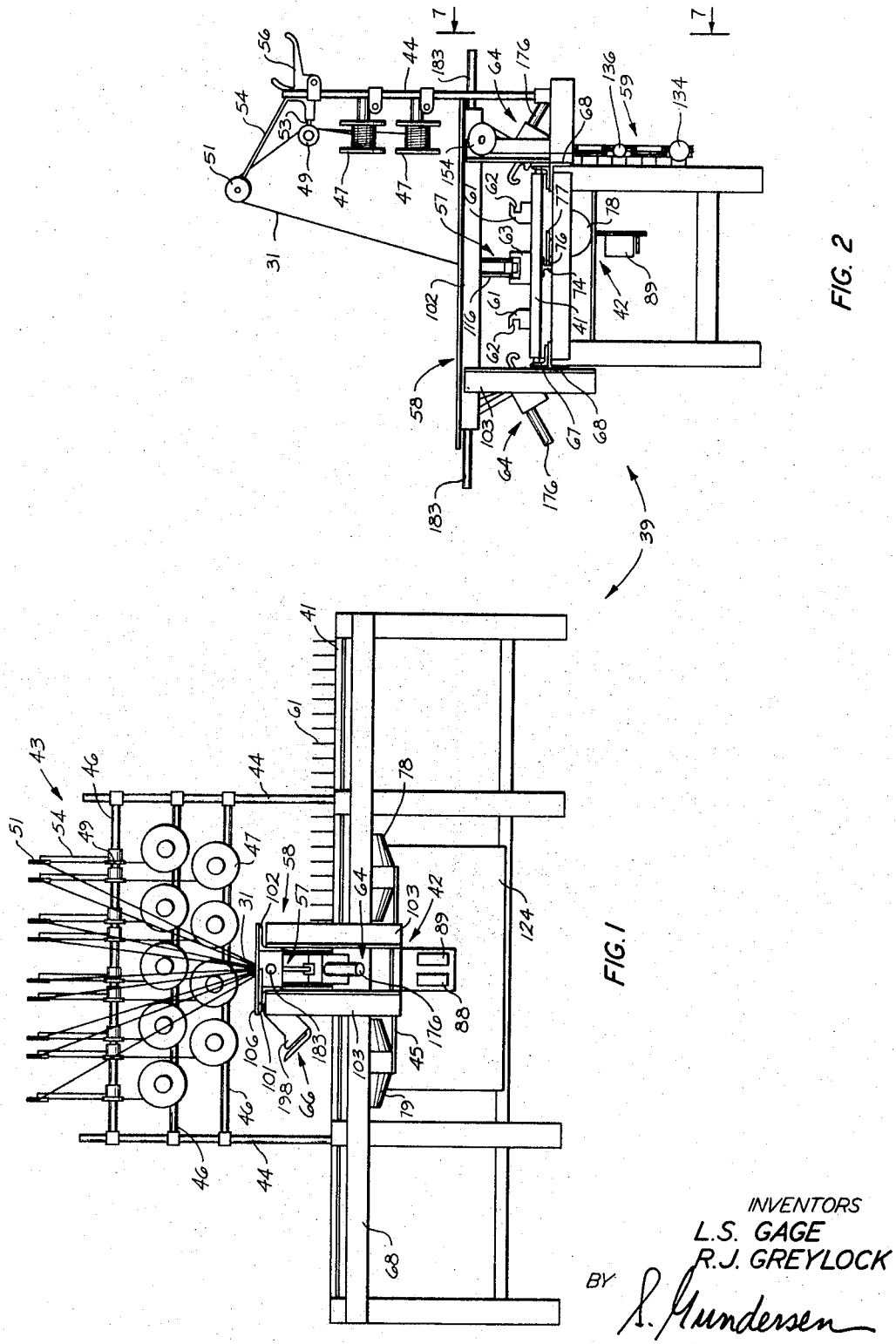

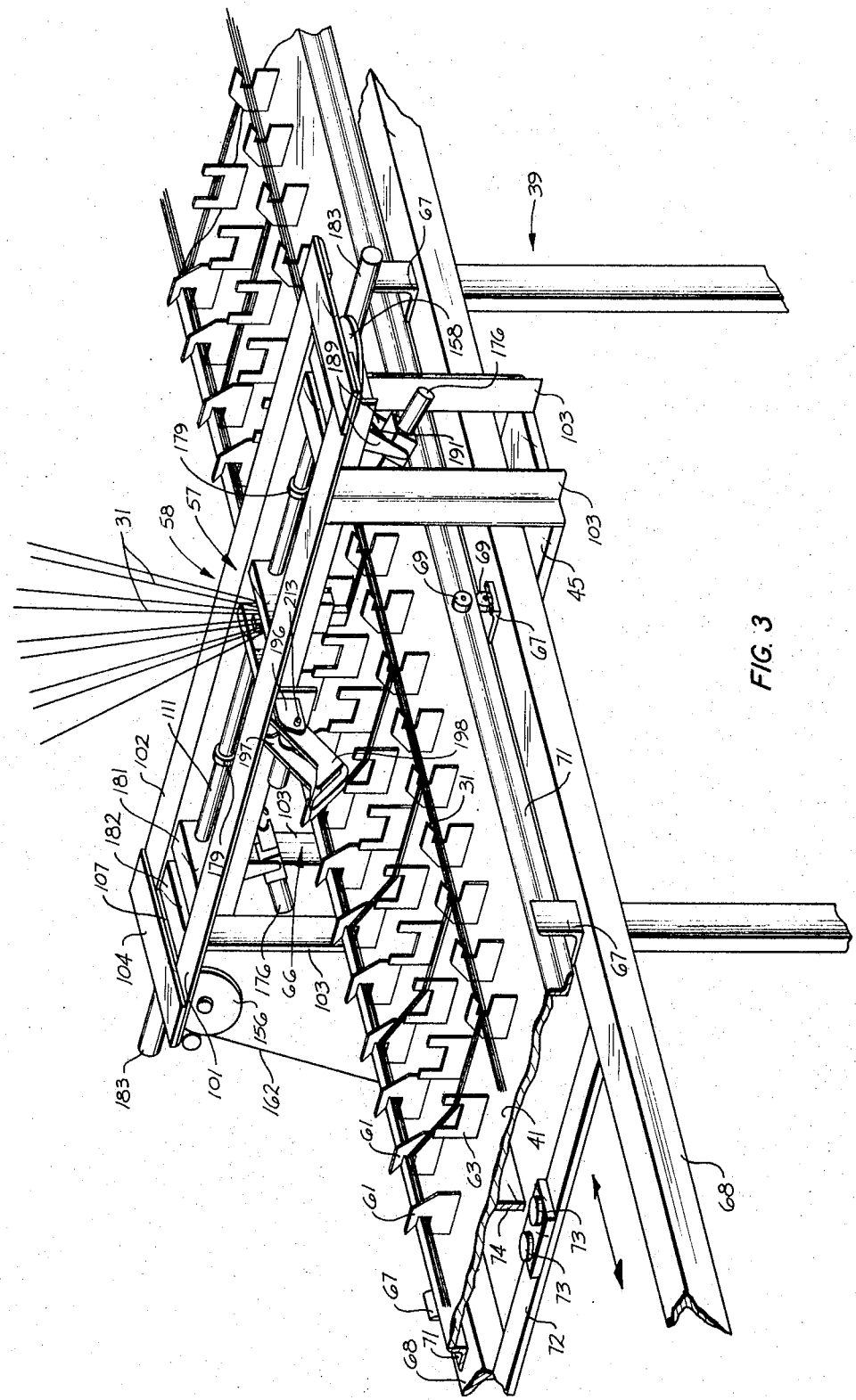

APPARATUS FOR FORMING HARNESS TYPE CABLES

Filed April 23, 1964          16 Sheets-Sheet 3

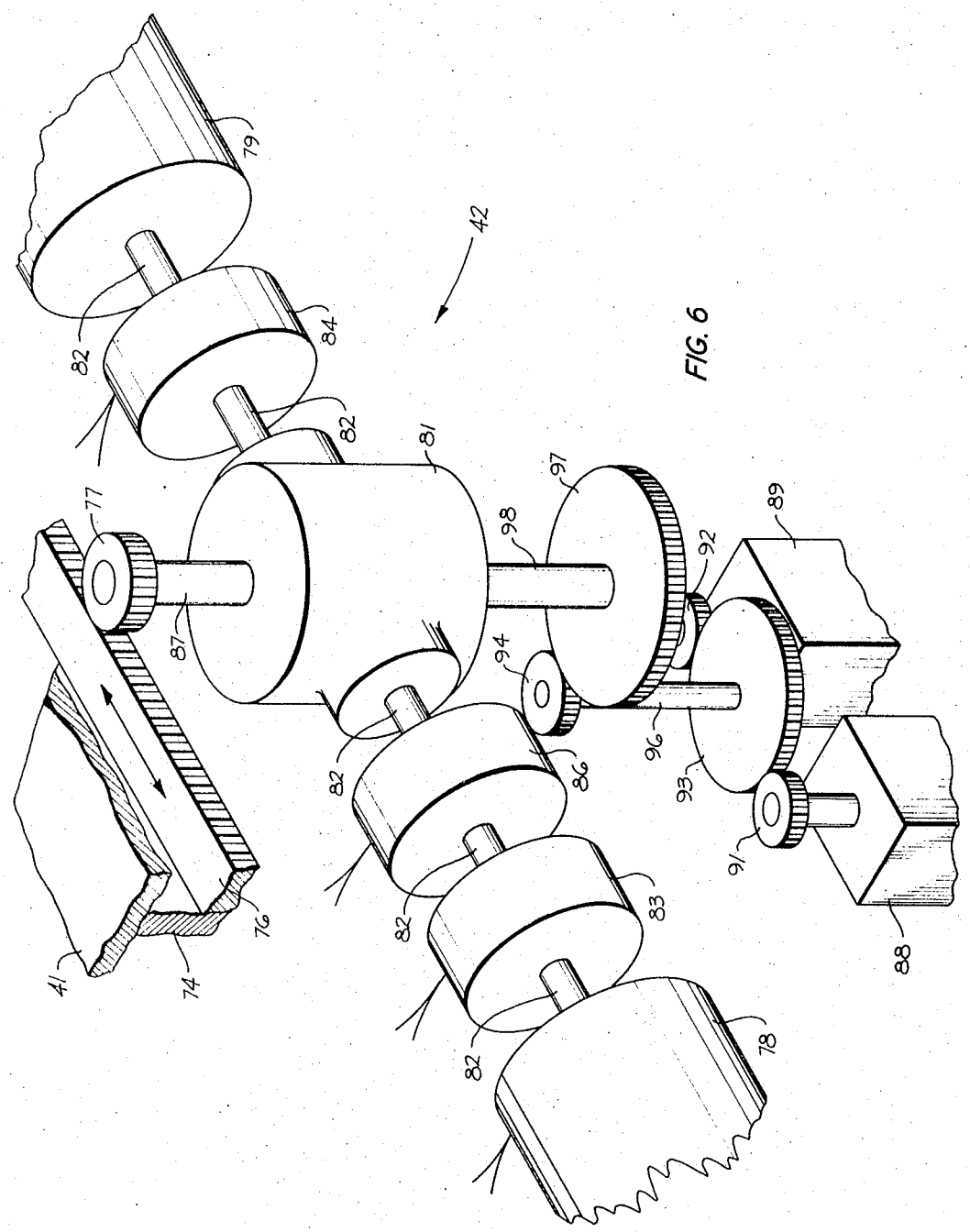

Sept. 12, 1967 L. S. GAGE ETAL 3,340,904
APPARATUS FOR FORMING HARNESS TYPE CABLES
Filed April 23, 1964 16 Sheets-Sheet 15

United States Patent Office 3,340,904
Patented Sept. 12, 1967

3,340,904
APPARATUS FOR FORMING HARNESS TYPE CABLES
Leon S. Gage, Granville, and Richard J. Greylock, Columbus, Ohio, assignors to Western Electric Company, Incorporated, New York, N.Y., a corporation of New York
Filed Apr. 23, 1964, Ser. No. 362,015
15 Claims. (Cl. 140—71)

This invention relates to apparatus for forming harness-type cables, and particularly relates to program-controlled apparatus for forming multiple types of cable harnesses.

Mass demand for various types of communications equipment has resulted in technical advancements in the manufacture of such equipment. With the influx of such a demand for the communications equipment, there is a growing need for cable harnesses having various break-outs to facilitate interconnecting various components of systems utilizing the equipment. In view of the many types of equipment utilized in the switching systems today, numerous patterns of interconnecting cable harnesses are required. To facilitate the manufacture of the cable harnesses, insulated wire strands which form the harnesses were manually wrapped around pegs extending from a forming board, wherein the pegs are prepositioned in the board in a pattern in accordance with the desired breakout pattern of the cable harness. It is apparent that, in view of the increasing demand for the various patterns of multiple-strand harnesses, the manual approach for forming such cables will impede the supply of the various types of communications equipment and minimize the effects of advancements realized in the manufacturing facilities.

It is, therefore, an object of this invention to provide new and improved apparatus for forming multiple-strand cable harnesses.

A further object of the invention is the provision of new and improved apparatus for forming twin-pairs of cable harnesses.

With these and other objects in view, the present invention contemplates the automatic control of apparatus for wrapping a multiple of grouped strands about a plurality of support prearranged in a desired pattern.

The apparatus includes a strand-receiving platform which reciprocates transversely relative to a reciprocable wire guide for distributing wire strands onto the platform in a desired pattern. A control system selectively controls the reciprocation of the platform and the wire guide to facilitate the distribution of the wire strands onto the platform in the desired pattern. Subsequently, the strands are bound and severed to complete the manufacture of a twin-pair of cable harnesses. Other objects and aspects of the present invention will become more readily understood from the following detailed description of a specific embodiment thereof when read in conjunction with the appended drawings, in which:

FIG. 1 is a front view of an apparatus for forming multiple-stranded cable harnesses in accordance with the principles of the invention;

FIG. 2 is a side view of the apparatus shown in FIG. 1;

FIG. 3 is a perspective view of the cable-forming apparatus showing an arrangement of cleats on a moving platform for providing corner posts during the subsequent cable-forming operation;

FIG. 6 is a perspective view of a driving and controlling mechanism for moving the platform which supports the cleats;

FIGS. 16 through 22 are electrical circuit digarams showing a schematical representation of the electrical control system, and FIG. 23 discloses the manner in which FIGS. 16 through 22 are disposed to illustrate the electrical control system.

Figure 23:
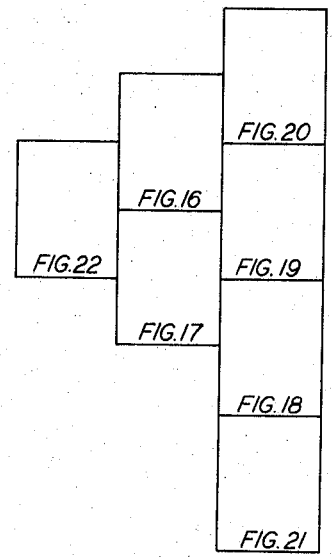
Figure 5:
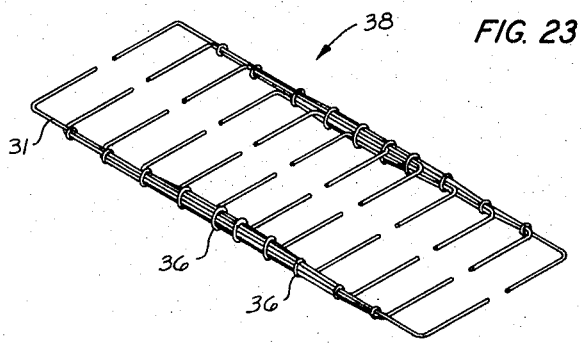
FIG. 5 is a perspective view showing a twin-pair of cable harnesses obtained from the multiple-forming pattern shown in FIG. 4.
Figure 4:
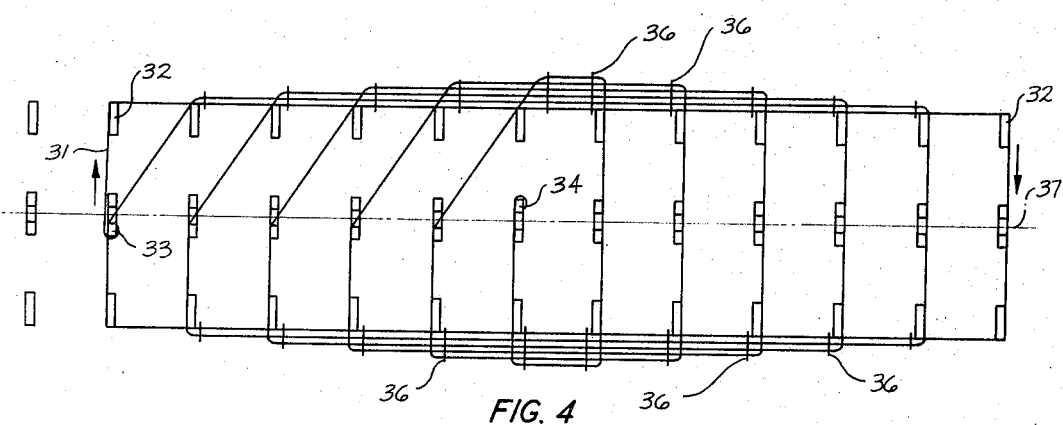
FIG. 4 is a view showing a representative pattern formed by the multiple strands in the cable harness forming operation.

Referring to FIG. 4, an example of one type of pattern of a cable harness produced by the apparatus of the invention shows the wrapping of a plurality of insulated strands of wire represented by the line 31 about two rows of corner supports 32 in a desired pattern. Initially, the leading end of the strands 31 are secured to a center lead support 33 and are thereafter guided around the corner supports 32 and secured to a center trailing support 34. A binding material, represented by the transverse lines 36, is wrapped around each of the groups of the plurality of strands of wire 31 adjacent the corner supports 32 and is thereafter secured to confine the wires in a pattern as shown. Thereafter, the wires 31 are severed along a cutting line 37. In this manner, a twin-pair of cable harnesses 38 are assembled as shown in FIG. 5. Referring to the pattern of distribution of the strands of wire 31 as shown in FIG. 4, it is noted that a plurality of successively smaller loops are formed as the strands are wrapped around corner supports 32, wherein each loop is wrapped around an individual set of 4 separate corner posts. In order to accomplish the distribution in accordance with the pattern as shown, a plurality of strands of wire 31 must be distributed from last corner support 32 in the bottom row of supports to a first corner support of the succeeding loop in the top row, wherein the first corner support of the succeeding loop is positioned to the right, as shown in FIG. 4, of the last corner support of the preceding loop. Hence, a skip motion is necessitated between the completion of one loop and the starting of another loop. The skip motion is accomplished by distributing the strands 31 from the last corner support 32 of the loop in the bottom row to an adjacent center support 34 and thereafter from the center support to the first corner support in the top row of the succeeding loop which is positioned to the right of the center post.

General description

As shown in FIGS. 1 and 2, a table frame 39 is provided for supporting a movable platform 41. A driving mechanism, generally designated by the reference numeral 42, is supported by a plate 45 suspended from the frame 39 and mechanically engages the platform 41 and provides reciprocable movement therefor. In addition, the table frame 39 supports a wire supply, generally designated by the reference numeral 43, and includes a pair of vertical posts 44 extending upwardly from a rearward portion of the frame wherein three horizontally spaced, cross arms 46 are connected between the posts. A plurality of wire supply reels 47 are attached to the lower two cross arms 46 and are each positioned to supply the strand of insulated wire 31 over respective pairs of guide pulleys 49 and 51 which are pivotally secured to a support 52 by means of stems 53 and 54, respectively. Each of the supports 52 are secured to the upper cross arms 44 and are provided with an adjusting mechanism 56 which controls the positioning of the pulley 51. In this manner, tensioning of the strands 31 can be controlled.

Figure 15:
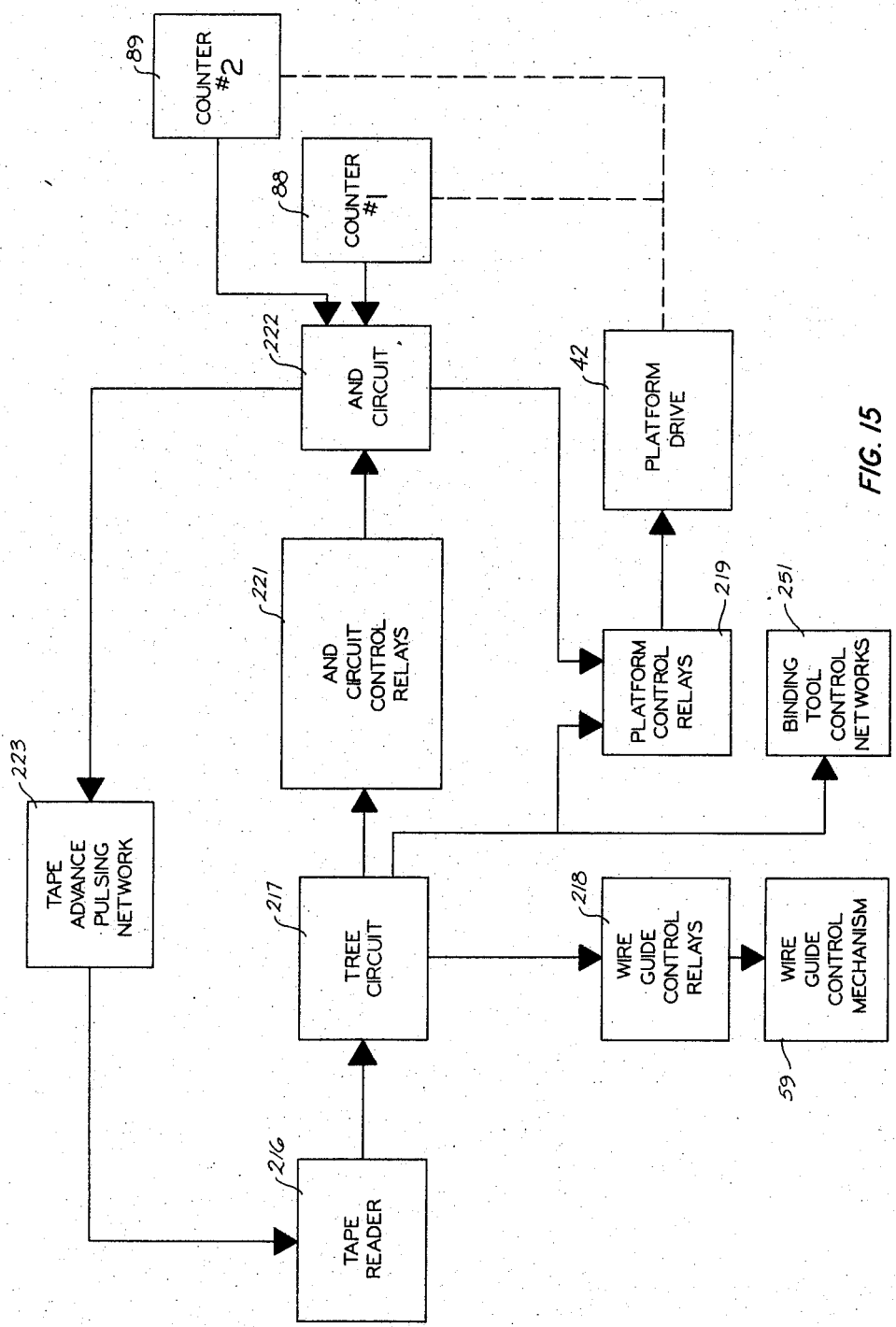
FIG. 15 is a block diagram showing an electrical control system for automatically controlling the operation of the apparatus in accordance with information supplied by a punched tape.
Figure 16:
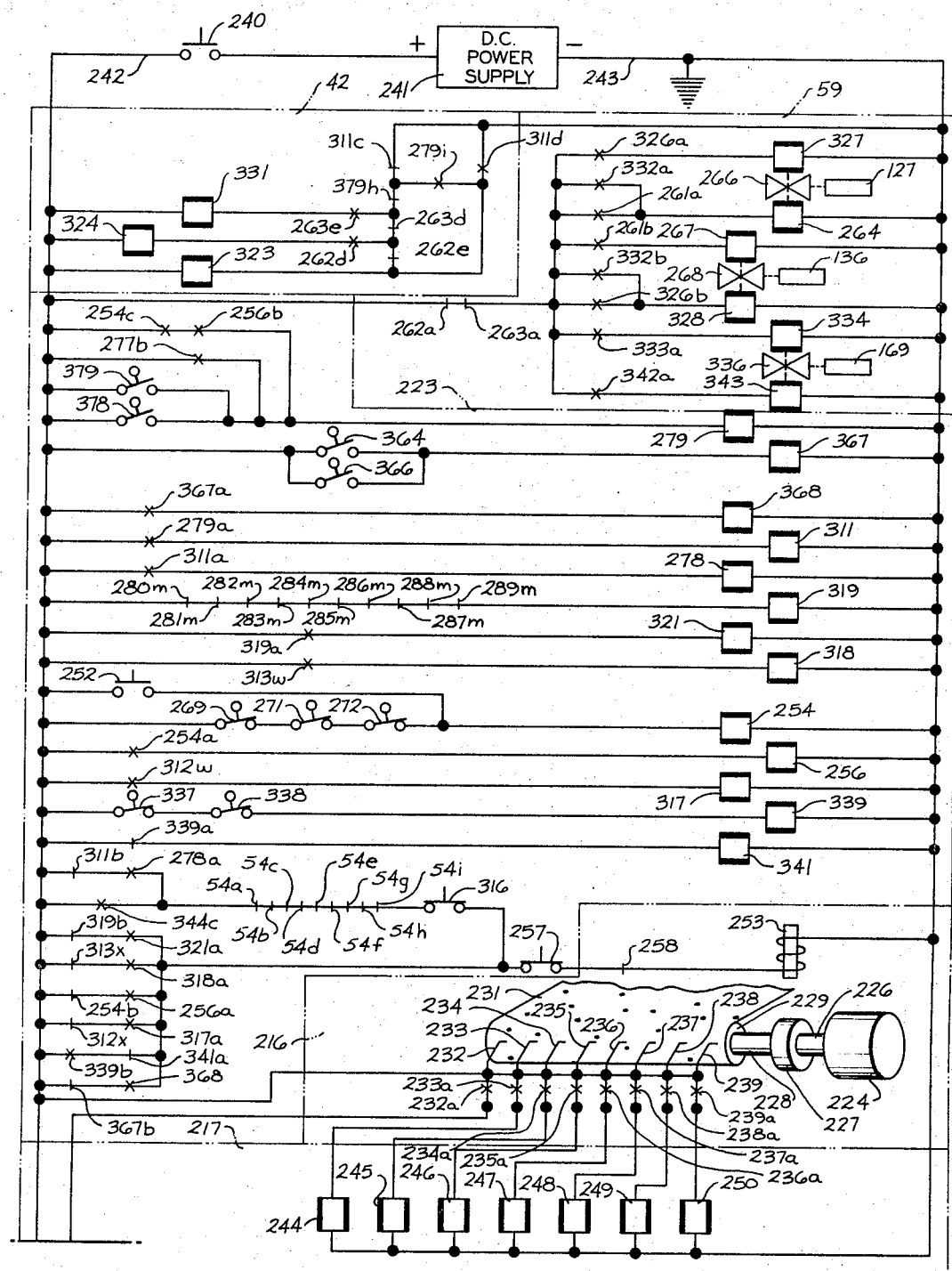

As shown in FIGS. 1, 2 and 3, a wire guide, generally designated by the reference numeral 57, is movably positioned on a bridging frame, generally designated by the reference numeral 58, for reciprocable movement thereon and guides therethrough the plurality of strands of wire 31 extending from the supply reels 47. As shown in FIG. 2, a wire guide control mechanism, generally designated by the reference numeral 59, is secured to the table frame 39 and controls the reciprocal movement of the wire guide 57. A pair of spacially-positioned, parallel rows of cleats 61, having openings 62 directed away from the cleats of the opposing row, are mounted on top of the platform 41, as shown in FIGS. 1, 2 and 3. It is noted that the cleats 61 function as the corner supports 32 as previously discussed and viewed in FIG. 4. In addition, a single row of bifurcated center supports 63 are mounted on top of the platform 41 centrally and spacially between the pair of rows of cleats 61. Initially, the left side of the platform 41, as viewed in FIGS. 1 and 3, is positioned directly beneath the wire guide 57 in such a manner that the wire guide is directly above the left end of the row of center supports 63. Thereafter, the strands of wire 31 are threaded through the wire guide 57 and are wrapped around the forward furcation of the center post 63 directly beneath the wire guide. A tape reading mechanism 216 (FIGS. 15 and 16) is operated to control the operation of the driving mechanism 42 for the platform 41 and the control mechanism 59 for the wire guide 57, whereafter the platform is periodically reciprocated to the left and to the right, as viewed in FIGS. 1 and 3, and the wire guide is moved transversely thereof, as viewed in FIG. 8. In this manner, the plurality of strands of wire 31 are positioned in the openings 62 of various cleats 61 in accordance with a pattern determined by programmed information punched into a tape 231 (FIG. 16). Subsequent to the forming operation, the trailing end of the plurality of strands of wire 31 are wrapped around a rearward furcation of a center post 63 located substantially centrally in the row of center posts. The formed strands of wire 31 are harnessed with a binding material adjacent the respective cleats 61 utilized in the forming operation in the manner, as shown in FIGS. 4 and 5, and as described hereinbefore. It is noted that the binding operation can be accomplished with a binding tool, generally designated by the reference numeral 64, such as that disclosed in our copending application Ser. No. 285,520, filed June 4, 1963, now Patent No. 3,250,209. Subsequent to the harnessing operation, the formed harnessed strands of wire 31 are severed along a path which extends centrally between the furcations and along the row of center posts 63 wherein the cutting operation is accomplished by a cutting mechanism designated generally by the reference numeral 66. In this manner, the twin-pair of cable harnesses 38 is formed as shown in FIG. 5. It is noted that while the cable harness 38 is symmetrical in the break-out and pattern formation, the forming apparatus can be utilized to manufacture various configurations of cable harnesses wherein succesively formed loop may be larger than and offset from preceding loops as compared to the successively smaller loops of the example shown in FIGS. 4 and 5.

Platform 41 and driving mechanism 42

As shown in FIG. 3, a plurality of angled elements 67 are spacially mounted on a pair of spaced, horizontal bars 68 which form a portion of the table frame 39. Each of the elements 67 support a pair of vertically spaced rollers 69 which receive and guide therebetween longitudinal, outwardly turned edges 71 of the platform 41. In addition, the table frame 39 is provided with a plurality of cross bars 72 (one shown) for supporting centrally between the bars 68, a pair of horizontally spaced rollers 73, which receive and guide therebetween a guide element 74 longitudinally and centrally mounted on the underside of the platform 41. Thus, as the driving mechanism 42 is actuated, the platform 41 is moved whereby the edges 71 are contained between and guided by pairs of the rollers 69 and the guiding element 74 is contained between and guided by the rollers 73. As shown in FIG. 2, and specifically in FIG. 6, a rack 76 is secured to the guide element 74 which extends beneath the platform 41 and is positioned to engage a pinion 77. A pair of continuously operating drive motors 78 and 79 are coupled to a gear box 81 by means of a series of in-line shafts 82 through a pair of electrically controlled clutches 83 and 84, respectively. In addition, an electrically controlled brake 86 is positioned between the clutch 83 and the gear box 81 to provide a braking means for the driving mechanism 42. The pinion 77 is secured to the free end of a shaft 87 which extends upwardly from the gear box 81 where, depending upon which clutch 83 or 84 is actuated, the respective drive motor 78 or 79 will rotate the pinion through the mechanism of the gear box to move the rack 76, and hence the platform 41, either to the left or to the right, as viewed in FIGS. 1 and 3.

As further shown in FIG. 6, a pair of mechanically actuated counters 88 and 89 are provided with actuating gears 91 and 92, respectively, mounted on the free ends of shafts which extend from counters. A common gear 93 is positioned between and in engagement with the counter gears 91 and 92, and is coupled to a driven gear 94 through a central shaft 96. A driving gear 97 is secured to the free end of a shaft 98 which extends downwardly from the gear box 81 and meshes with the gear 94. The counters 88 and 89 are designed to provide an electrical signal upon the counting of a given total and are preset by an electrical control circuit (FIGS. 15 through 22) which is programmed by information fed from the tape reader mechanism 216 (FIGS. 15 and 16). The counters 88 and 89 are associated with and control the clutches 83 and 84 and are conditioned, through the electrical control circuit, to operate independently of the other counter and also not to operate when the other counter is conditioned to provide an electrical signal upon reaching the given total count. Therefore, assuming that the clutch 83 is actuated and the clutch 84 is not actuated, the electrical control circuit provides programmed information for the counter 88 from the tape reader mechanism 216 where such information is indicative of the desired distance of travel for the platform 41. As the platform 41 is moved, the counters 88 and 89 are independently and mechanically operated, however, only the counter 88 is conditioned to provide an electrical signal upon registering the total count in terms of the programmed information supplied to the counter by the tape reader mechanism 216 through the electrical control circuit. As the counter 88 registers the programmed total count, an electrical signal is developed through the counter 88 to release the clutch 83 and operate the brake 86, resulting in the removal of the rotational driving force supplied to the shafts 87 and 98 through the gear box 81. When it is desired to move the platform 41 in the opposite direction, the tape reader mechanism 216 provides programmed information to the electrical circuit to condition the counter 89. In addition, information is supplied to the electrical control circuit to release the brake 86 and actuate the clutch 84, whereupon the platform 41 moves in the opposite direction until the counter 89 reaches the programmed count. The driving force is again removed and the platform 41 ceases to move.

*Bridging frame 58 and wire guide 57*

Figure 8:
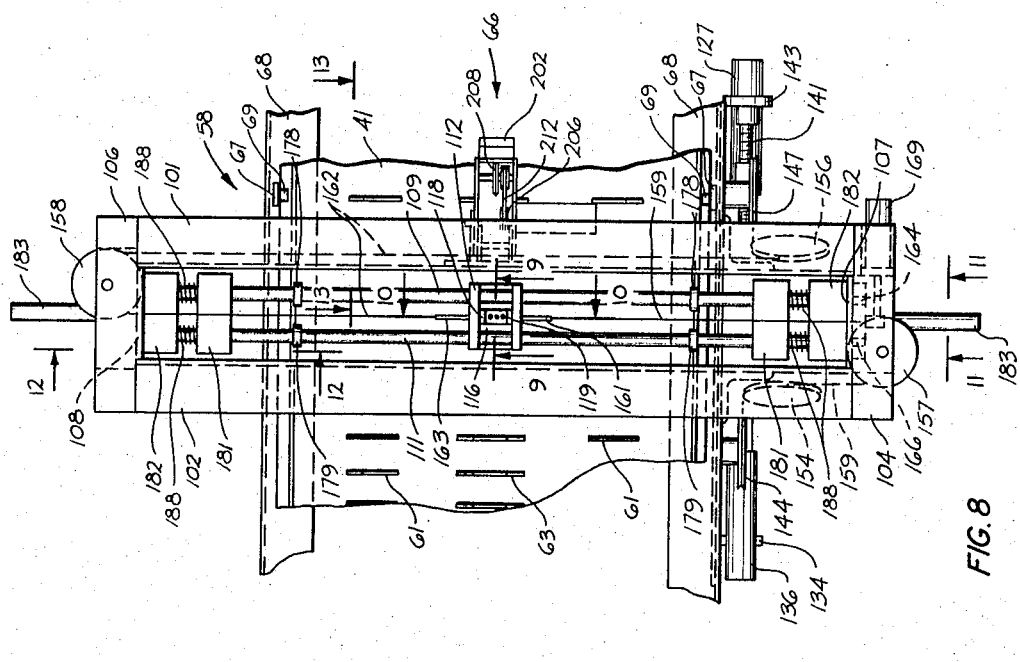
FIG. 8 is a partial view, taken along line 8—8 of FIG. 7, showing a top view of a portion of the mechanism for controlling movement of the wire guide.

As shown in FIGS. 3 and 8, a plate 124 is secured to and spans horizontally a central portion of the underside of the horizontal bars 68 which form a portion of the table frame 39. The bridging frame 58 is provided with a pair of parallel, spaced bars 101 and 102 which are spaced transversely above the platform 41 and secured to a plurality of uprights 103 extending upwardly from and secured to the bars 68. A pair of mounting plates 104 and 106 are secured to opposite longitudinal ends of the spaced bars 101 and 102. In addition, vertical support plates 107 and 108 are mounted between the opposite longitudinal ends of the bars 101 and 102 and support therebetween a pair of parallel, spaced guide rods 109 and 111 for receiving and slideably supporting the wire guide 57.

Figure 9:
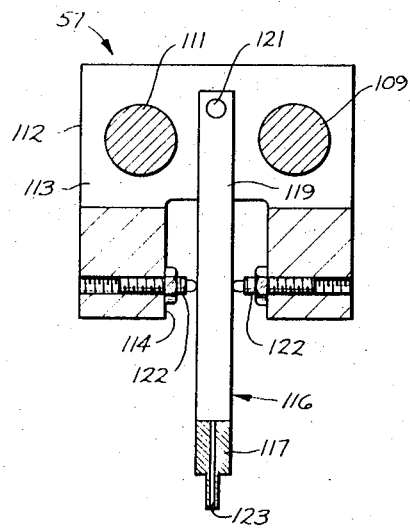
FIG. 9 is a sectional view taken along line 9—9 of FIG. 8 showing a support for the wire guide.
Figure 10:
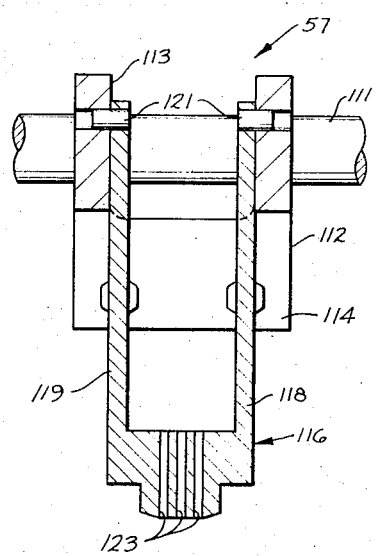
FIG. 10 is a sectional view, taken along line 10—10 of FIG. 8, showing the wire guide mounted in the support.

As shown in FIGS. 9 and 10, the wire guide 57 is provided with a support member 112 formed with transverse and communicating channels 113 and 114 in opposite halves thereof. Opposed vertical walls of the channel 113 are formed with pairs of in-line transverse apertures for receiving guide rods 109 and 111, respectively, therethrough whereby the support member 112 is supported for guiding movement longitudinally on the guide rods. A substantially U-shaped pencil guide 116 having a base portion 117 communicating with a pair of upwardly extending parallel, spaced legs 118 and 119 is assembled with the support member 112 in such a manner that the legs of the guide extend through the channel 114, the communicating opening between the channels 113 and 114, and into the channel 113 so that the spaced legs of the guide are parallel and in engagement with the walls of the channel 113. Transverse apertures formed in the free ends of the legs 118 and 119 of the pencil guide 116 are aligned with the apertures formed in the walls of the channel 113 for receiving a pair of pins 121 therein, whereby the pencil guide 113 is pivotally secured to the support member 112. In addition, two pairs of spacially opposed spring-loaded plungers 122 are threadedly positioned within the support member 112 and extend from the walls of the channel 114 into engagement with opposite sides of the upwardly extending legs 118 and 119 of the pencil guide 116 to provide a resilient aligning feature for the guide relative to the support member 112. The base portion of the pencil guide 116 is formed with a plurality of spaced apertures 123 which are parallel with the legs 118 and 119 for receiving and guiding the plurality of strands of wire 31 therethrough. While only three such apertures 123 are shown in FIG. 10, it is to be understood that additional apertures may be provided to facilitate the feeding of additional strands of wire 31. Thus, upon actuation of the wire guide control mechanism 59, the wire guide 57 is moved along the rods 109 and 111 transverse to the platform 41, thereby distributing the plurality of strands of wire 31 from one side to the other side of the platform.

*Wire guide control mechanism 59*

Figure 7:
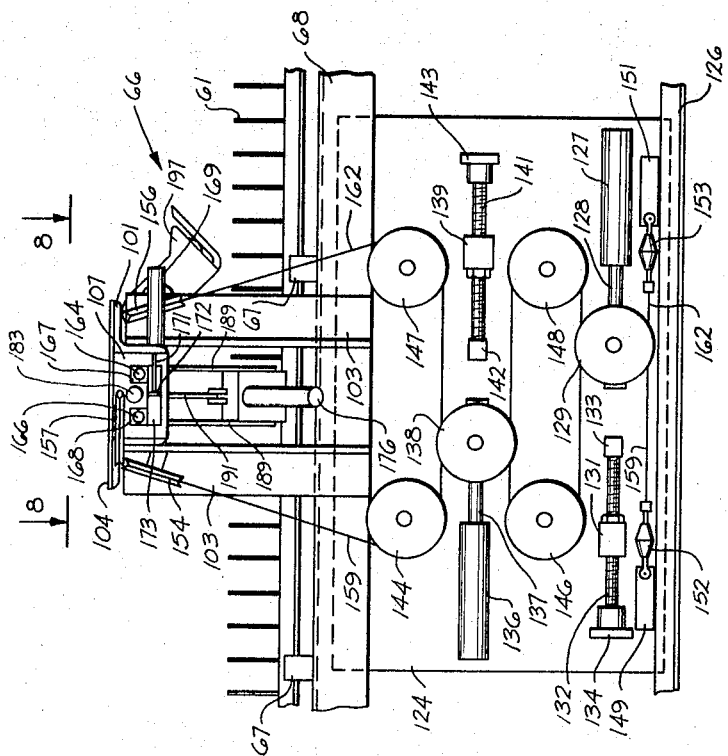
FIG. 7 is a partial view, taken along line 7—7 of FIG. 2, showing a mechanism for controlling the transverse movement of a wire guide relative to the platform for feeding the multiple-stranded wire about the cleats.

As shown in FIGS. 2 and 7, the control mechanism 59 for the wire guide 57 is supported substantially by a vertical support plate 124 which extends between the rearward bar 68 and a lower support bar 126 which forms a portion of the table frame 39. A first double-acting air cylinder 127 is secured to the plate 124 in a horizontal position and has a piston rod 128 which supports for rotation at the free end thereof, a dual grooved sheave 129. A support extension 131 extends from the plate 124 and supports a threaded rod 132 having a stop 133 at one end thereof and an adjusting handle 134 at the opposite end thereof, wherein the stop 133 is in axial alignment with the piston rod 128. A second double-acting air cylinder 136 is secured to the plate 124 in horizontal position and is provided with a piston rod 137 which supports for rotation at the free end thereof a dual grooved sheave 138. A support extension 139 extends from the plate 124 and supports a threaded rod 132 having a stop 133 at one end thereof and an adjusting handle 143 at the opposite end thereof wherein the stop 142 is in axial alignment with the piston rod 137. The plate 124 further supports for rotation, single grooved sheaves 144, 146, 147 and 148. In addition, a pair of blocks 149 and 151 pivotally support a pair of turnbuckles 152 and 153, respectively.

As shown in FIGS. 7 and 8, a pair of single grooved, sheaves 154 and 156 are angularly secured for rotation to the spaced rearward uprights 103, respectively. In addition, a single grooved, sheave 157 is secured for rotation to the underside of the mounting plate 104 and a sheave 158 is secured for rotation to the underside of the mounting plate 106. A metallic driving cord 159 is secured at one end thereof to the turnbuckle 152 and passes over, in the following order, sheaves 129, 146, 138, 144, 154, and 157 and is attached to a securing member 161 which is secured to and extends from the wire guide 57. Another metallic driving cord 162 is secured at one end thereof to the turnbuckle 153 and passes over, in the following order, sheaves 129, 148, 138, 147, 156 and 158 and is attached at the opposite end thereof to a securing member 163 secured to and extending from the wire guide 57. Thus, as shown in FIGS. 7 and 8, when the air cylinders 127 and 136 are in the retracted condition, the wire guide 57 assumes a central position substantially superjacent the row of center posts 63 of the platform 41. When the air cylinder 136 is operated on the forward stroke, the piston rod 137 moves the sheave 138 toward the stop 142, whereby the cord 159 is pulled relatively downwardly, as viewed in FIG. 7, and the wire guide 57 moves toward the rearward row of cleats 61 of the platform 41, or downwardly as viewed in FIG. 8. In order to move the wire guide 57 from the position above the rearward row of cleats 61 to a position above the forward row of cleats, the piston rod 137 of the air cylinder 136 is retracted so that the wire guide moves to the central position, as shown in FIG. 8, and the air cylinder 127 is operated on the forward stroke to move the sheave 129 toward the stop 133, whereby the cord 162 moves relatively downwardly, as viewed in FIG. 7, so that the wire guide is moved forwardly, or upwardly from a central position, as viewed in FIG. 8. Hence, by sequential operation of the double-acting air cylinders 127 and 136, the wire guide 57 may be moved from one edge to the other edge of the platform 41, thereby distributing the plurality of strands of wire 31 passing through the apertures 123 of the pencil guide 116. In this manner, the plurality of strands of wire 31 are extended from the opening 62 of one of the cleats 61 in a given row to the opening 62 of an adjacent cleat 61 of the other row.

Figure 11:
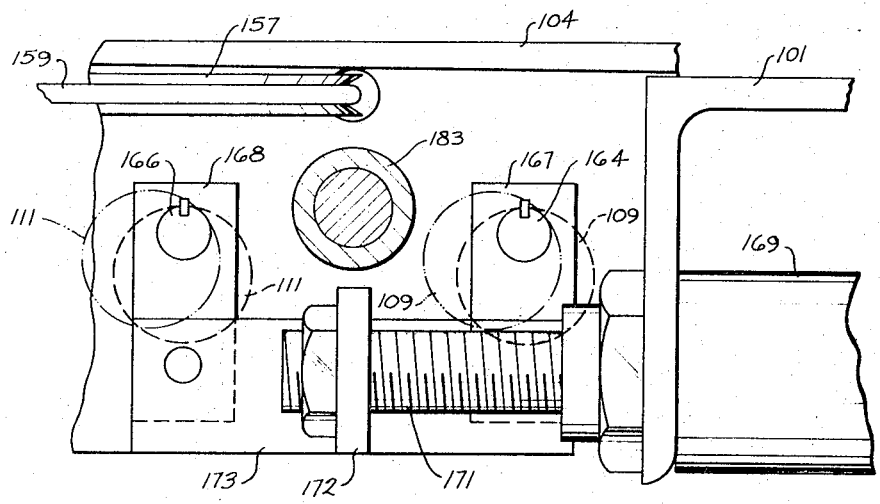
FIG. 11 is a partial view, taken along line 11—11 of FIG. 8 showing a mechanism for rocking the wire guide.

In order to accomplish the diagonal distribution of the wires 31 as shown on the left side of the pattern of FIG. 4 and as previously discussed, a skip motion must be imparted to the wire guide 57. As shown in FIG. 11, the guide rods 109 and 111 do not extend completely through the support plate 107 but are provided with eccentric extensions 164 and 166, respectively, which extend through the plate 107 and are keyed to rocker arms 167 and 168, respectively, a double-acting air cylinder 169 is mounted on the bar 101 and is provided with a piston rod 171 which is attached at the free end thereof to a yoke 172 extending transversely and centrally from a linking arm 173 which links together the rocker arms 167 and 168. Upon operation of the air cylinder 169, the linking arm 173 is moved to the left as viewed in FIG. 11, whereby the guide rods 109 and 111 are rocked clockwise, as shown in phantom, thereby swinging the base portion 117 of the pencil guide 116 in a clockwise direction as viewed in FIG. 9.

To accomplish the skip operation, the wire guide 57 is moved from a forward position, as viewed in FIG. 3, to a center position above a center post 63, whereafter the wire guide is stopped. Subsequently, the air cylinder 169 is operated to rock the guide rods 109 and 111 so that the wire guide 57 is skipped from a position to the left of the center post 63 to a position to the right of the center post, as viewed in FIG. 3, referred to as a skip right motion. Thereafter, the wire guide 57 is held in the skip position and moved to a rearward position above the rearward row of cleats 61. The air cylinder 169 is operated in a reverse direction to skip the wire guide 57 to a normal position on a skip left motion. As the platform 41 is moved to the left, as viewed in FIG. 3, the strands of wire 41 are distributed in the opening of the cleat 61 which is adjacent to the right of the center post 63 over which the wire guide passed during the skip motion thereby completing the skip operation.

*Binding tool 64 and cutting mechanism 66*

Figure 12:
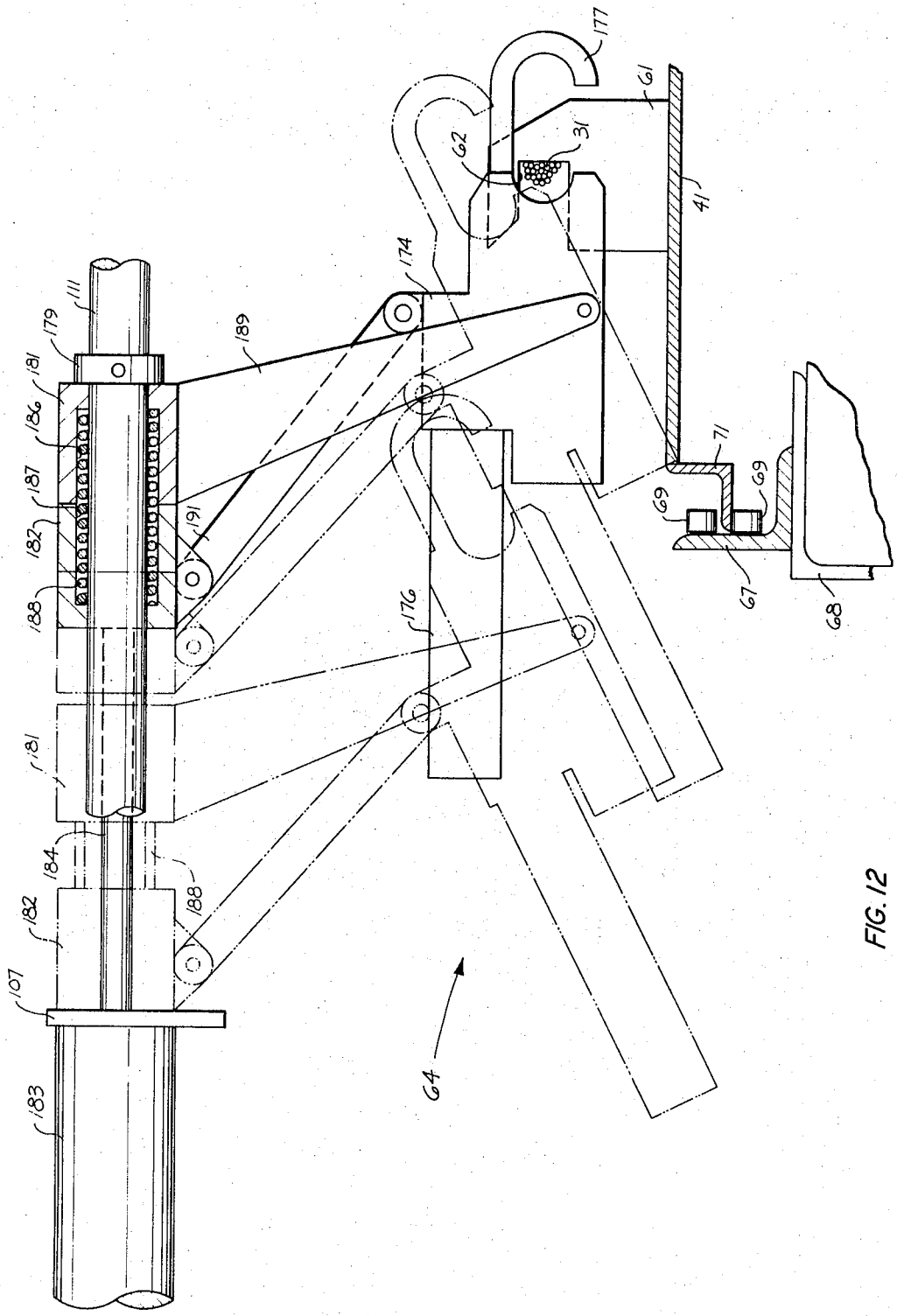
FIG. 12 is a sectional view taken along line 12—12 of FIG. 8 showing a mechanism for positioning a binding tool adjacent a group of strands of wire for securing a binding material about the strands.

As shown in FIG. 12, the binding tool 64, as disclosed in our copending application referred to hereinbefore, is provided with a housing 174 for supporting operating structure of the tool. A rotating air motor 176, which controls operation of the tool 64, extends from a rearward portion of the housing 174 and a slidable hook 177 extends from the forward end of the housing. The hook 177 is spaced from the housing in a nonoperative position thereby providing a passage to facilitate the positioning of the hook about the strands of wire 31 which are positioned within the openings 62 of the cleats 61. As shown in FIGS. 2 and 3, a pair of binding tools 64 are moveably supported from the bridging frame 58 and are positioned at the forward and rearward ends of the bridging frame. Such positioning of the binding tool 64 facilitates the binding of the strands of wire 31 which are resting within the openings 62 of the forward and rearward rows of cleats 61. Since both binding tool 64 are identical and are assembled with the bridging frame 58 in same manner, the operation of one such tool will be discussed, but it is to be understood that the two tools operate in the same manner. As shown in FIGS. 8 and 12, a pair of collars 178 and 179 are secured on an intermediate portion of the rods 109 and 111, respectively. In addition, a pair of slides 181 and 182 are positioned on opposite ends of the rods 109 and 111. A double-acting air cylinder 183 is secured to the plate 108 at one end of the bridging frame 58 and is provided with a piston 184 which is secured to the slide 182. The slides 181 and 182 are each provided with openings 186 and 187, respectively, to facilitate the reception of compression springs 188 whereby the slides are normally urged apart as shown in the left phantom view in FIG. 12.

As shown in FIGS. 3 and 12, a pair of arms 189 are fixedly secured to the slide 181 and extend downwardly from the slide in a bifurcated manner and are pivotally secured to opposite sides of the housing 174. Further, a linkage arm 191 is pivotally secured at one end thereof to a central portion of the underside of the slide 182 and is pivotally secured at the opposite end thereof to a central portion of the upper surface of the housing 174. Subsequent to the completion of the wrapping of the strands of wire 31 within the openings 62 of the cleats 61 in the desired pattern, the air cylinder 183 is operated whereby the piston rod 184 is moved to the right, as viewed in FIG. 12. In this manner, the slide 182, which is secured to the free end of the piston rod 184, is moved toward the slide 181 from a nonoperative position as viewed in the left phantom view. Due to the force of the compression spring 188, the slide 181 is spaced from the slide 182 but moves to the right as the slide 182 is moved to the right upon operation of the air cylinder 183. In this manner, the binding tool 64 is carried to a position as shown in the right phantom view of FIG. 12, wherein the spacing between the slides 181 and 182 is still maintained due to the force of the compression springs 188. Subsequently, the slide 181 engages the fixed collars 178 and 179, whereby continued sliding movement of the slide 181 along the rods 109 and 111 is precluded. Continued movement of the piston rod 184 urges the slide 182 against the biasing action of the compression spring 188 and into engagement with the slide 181. As the slide 182 moves toward and relative to the slide 181, the linkage arm 191 pivots in such a manner that the binding tool 64 assumes a position as shown in the solid line view of FIG. 12. Hence, the open hook 177 is positioned about the strands of wire 31 in the manner as shown in FIG. 12. Thereafter, the hook 177 is drawn toward the housing 174 to surround the strands of wire 31, whereafter a binding material is wrapped around and secured about the strands of wire in a manner described in our previously mentioned copending application. As shown on FIGS. 4 and 5, the strands of wire 31 adjacent to each cleat 61 are bound. To accomplish the binding in this manner, the platform 41 is sequentially operated so that areas to be bound in sequence are positioned adjacent the binding tools 64. Thereafter, the mechanism for moving and operating the tool 64 is sequentially operated to move the tool to a position between adjacent cleats 61 and bind the stands of wire 31 extending between the cleats and, thereafter remove the tool from between the cleats so that the platform 41 may be moved to the next position requiring a binding operation.

As shown in FIGS. 3, 8, 13 and 14, the cutting mechanism 66 is secured to the longitudinal bar 101 of the bridging frame 58 centrally above the platform 41 and above and between the furcations of the center posts 63. A support plate 192 is secured to the bar 101 and has fixedly secured thereto a pair of spaced pivot supports 193 and 194. In addition, a pin support plate 196 is fixedly secured to the plate 192 and is spaced from the outside surface of the pivot support 194. A pair of arms 197 and 198 are pivotally secured to the outside surfaces of the pivot supports 193 and 194, respectively, by a shaft 199. An L-shaped member 201 is secured between the arms 197 and 198 and extends past the free ends of the arms to provide a beveled guide foot 202 for the cutting mechanism 66. In addition, a rod 203 extends between portions of the free ends of the arms 197 and 198. An electric motor 204 is secured to the outer surface of the arm 197 and driving sheave 206 is mounted on a shaft 207 extending from the motor and positioned between intermediate portions of the arms 197 and 198. A cutting wheel 208 and a second sheave 209 are mounted for rotation on a shaft 211 wherein a drive belt 212 connects the sheaves 206 and 209 for providing rotational movement for the blade upon operation of the motor 204. A spring-loaded pin 213 supported by the pin support plate 196 is inserted into an aperture formed in the arm 198 to retain the cutting mechanism 66 in a nonoperative position as shown in solid lines in FIG. 13. In this manner, the wrapping of the strands of wire 31 about the cleats 61 in a desired pattern, and the subsequent harnessing of the wrapped strands, can be accomplished without interference from the cutting mechanism 66. Subsequent to the wrapping and harnessing operations, the operator operates the platform driving mechanism 42 to position the platform 41 on the left end of the table 39 as view in FIG. 1. Thereafter, the operator manually withdraws the spring-biased pin 213 to a position wherein the cutting mechanism 66 is pivoted downwardly as shown in phantom lines in FIG. 13. Thus, the beveled foot 202 is positioned between the furcations of the row of center posts 63 where, upon movement of the platform to the right, as viewed in FIG. 1, the strands of wire 31 passing substantially and transversely to the center posts 63 are guided into a slot 214 formed by the lower leg of the L-shaped member 201 and the arms 197 and 198. In this manner, the strands of wire 31 are exposed to the rotating cutting wheel 208 and are severed along the cutting line 37 as viewed in FIG. 4 to provide the twin-pair cable harnesses 38 as viewed in FIG. 5.

*Electrical control circuit*

An electrical control circuit is shown in FIGS. 16 through 22 and employs a type of notation referred to as "detached contacts" in which a line perpendicular to a circuit lead represents normally closed contacts and "X" represents normally open contacts, "normally" referring to the unoperated condition of a relay or other contact controlling device, such as a cam or stepping switch. For a complete exposition of this type of notation, reference should be made to an article entitled "Improved Detached Contact Circuit Drawing" by F. T. Meyer, vol. 74, Electrical Engineering, p. 645, August 1955. In addition, contacts associated with a given relay assume the number assigned to the relay followed by a small letter. For example, contact 279a is associated with, and controlled by, the relays 279.

As shown in FIG. 15, a block diagram schematic displays generally the electrical programming and control features of the cable forming and harnessing apparatus in accordance with the invention. Initially, the tape reader mechanism 216 senses programmed information supplied by the punched tape 231 (FIG. 16) and transfers this information through a tree circuit 217 to a wire guide control relay system 218 to control the wire guide control mechanism 59. In addition, information is fed to a platform control relay system 219 for controlling the platform drive 42. It is noted that the wire guide control mechanism 59 and the platform driving mechanism 42 do not operate simultaneously, therefore, the information derived from the tape reader 216 will initiate operation of either the wire guide control mechanism 59 or the platform driving mechanism 42. The tree network 217 also supplies information to an "AND" circuit relay control system 221 which conditions one side of an "AND" circuit 222. The counters 88 and 89 are mechanically connected to the platform drive 42 as previously discussed and are set to operate the other side of the "AND" circuit 222 when a programmed total count is registered by the respective counter conditioned for such operation. This information is fed from the "AND" circuit 222 to a tape advance pulsing network 223 which steps the tape reader 216 to the next bit of programmed information. Subsequent to the completion of the movements of the platform 41 and the wire guide 57 in wrapping the strands of wire 31 about the cleats 61 as previously described, information is supplied by the tape 231 to a binding tool control network 251 for operating the binding tools 64 in the manner described to bind the grouped strands of wire adjacent the cleats.

Figure 18:
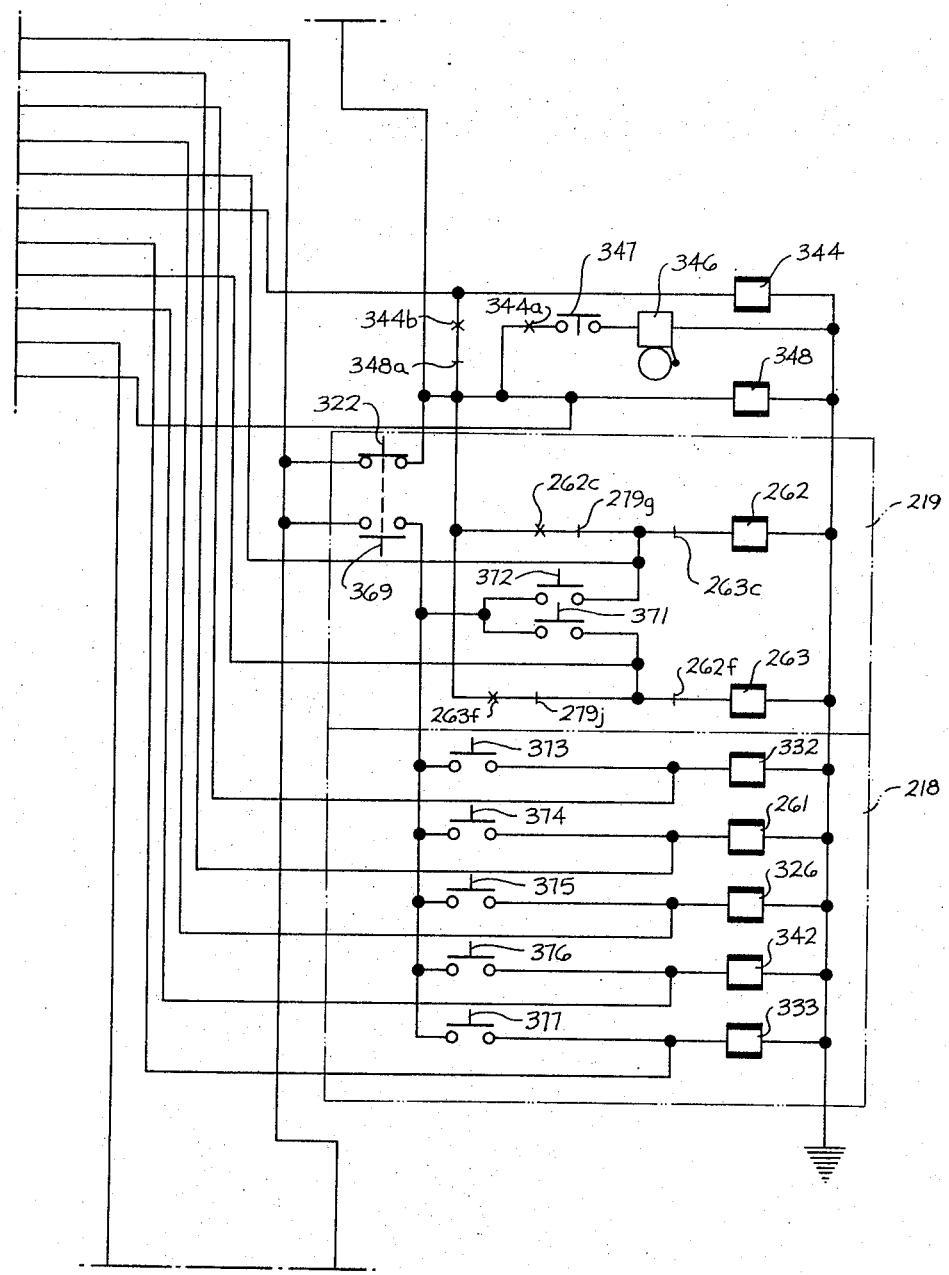
Figure 19:
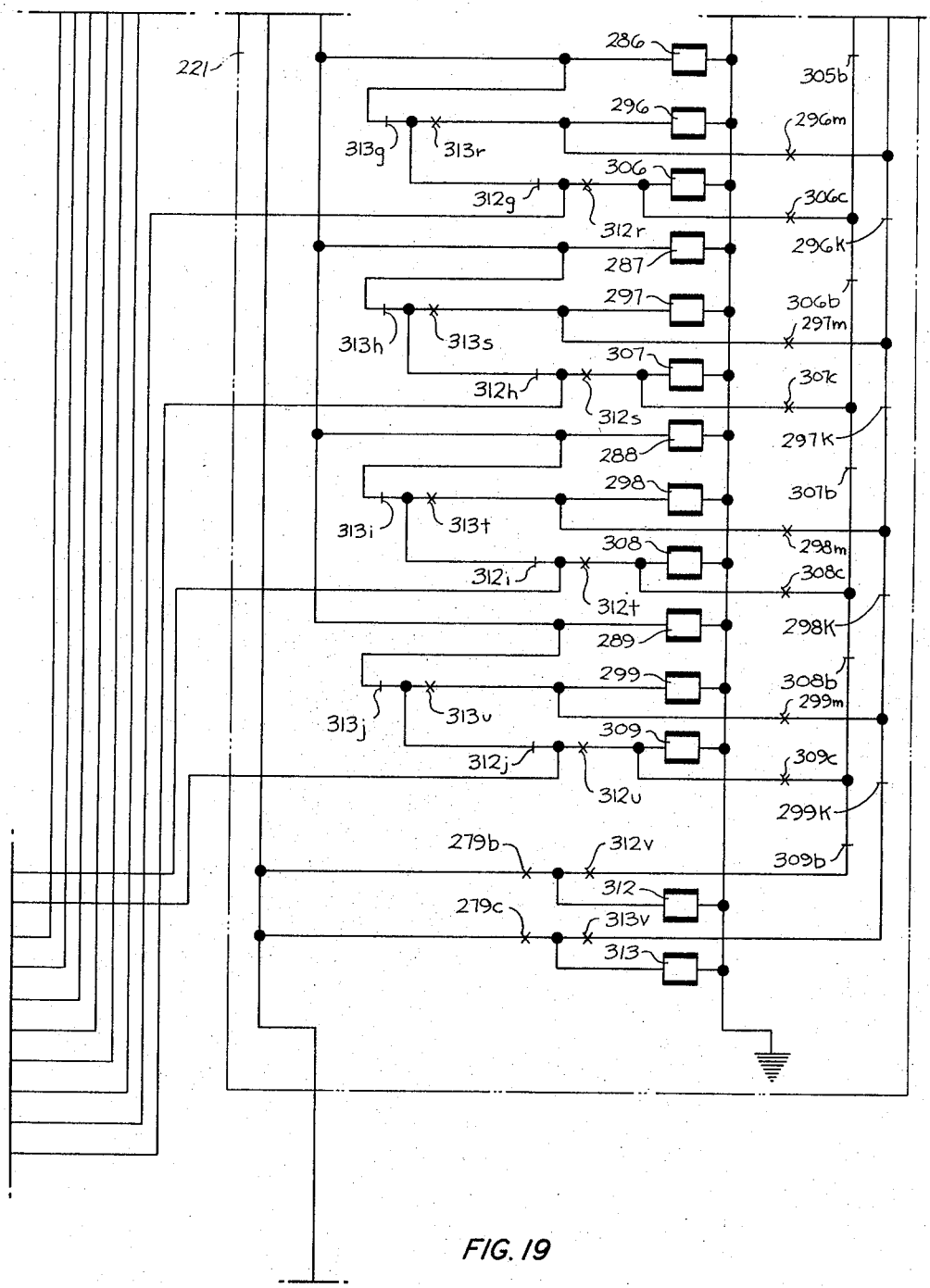
Figure 20:
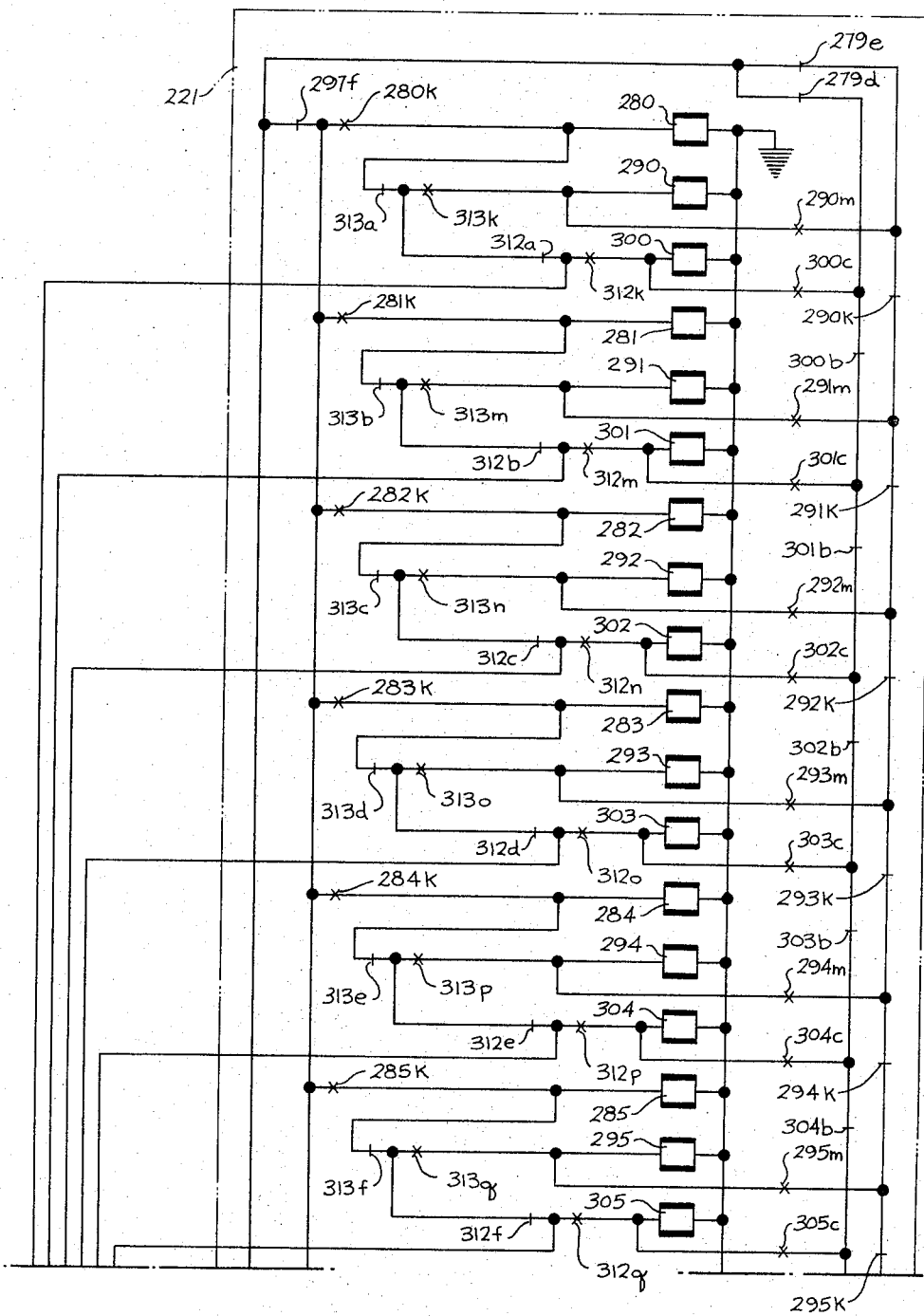
Figure 21:
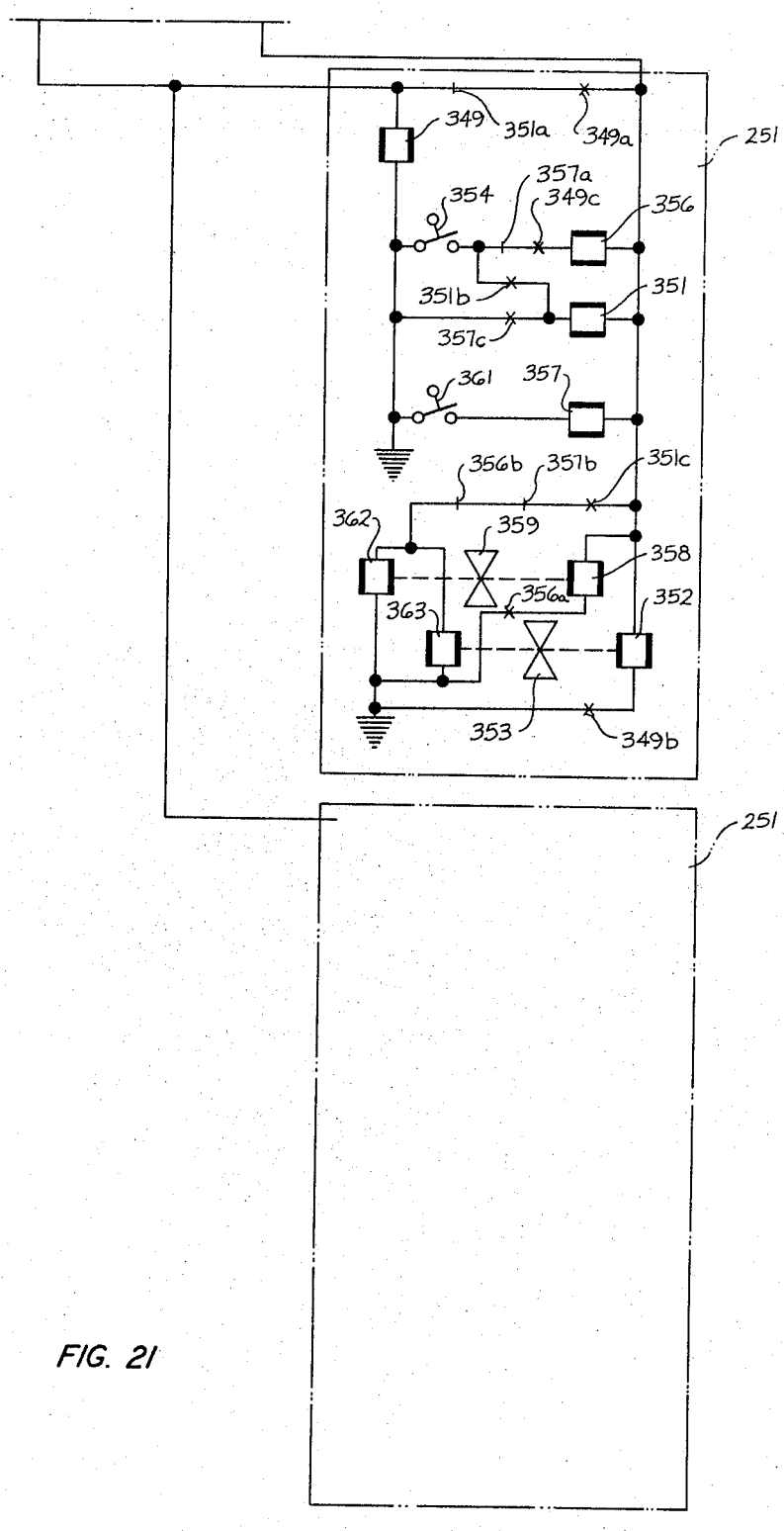

As shown in FIG. 16, the tape reader mechanism 216 is provided with a continuously operating drive motor 224 connected to a power source (not shown), wherein the motor rotates a shaft 226 which is coupled to a magnetic clutch 227. A shaft 228 extends from the clutch 227 and is coupled to a drive roller 229 for stepping the punched tape 231 adjacent a plurality of sensing fingers 232 through 239. Apertures are punched in the tape 231 in accordance with information for operating the cable harness-forming apparatus, wherein the fingers 232 through 239 sense a pattern of such punched apertures transversely displayed on the tape along the row of fingers. As the fingers 232 through 239 sense the punched apertures in the tape, a corresponding plurality of contacts 232a through 239a are closed in accordance with the pattern of punched apertures sensed by the fingers. As further shown in FIG. 16, a power source 241 supplies operating potential for the various controlling relays and components of the circuit, wherein a positive potential is applied to a line 242 and a ground potential is applied to a line 243 upon the manual closure of a switch 240. The positive potential applied to line 242 is coupled through the contacts 233a through 239a to one side of a corresponding plurality of tree network control relays 244 through 250, respectively, while the opposite sides of the relays are connected to the ground potential applied to line 243. As shown on FIG. 17, the tree nework 217 includes a plurality of contacts controlled by the relays 244 through 250 (FIG. 16), wherein the operation of such tree network contacts is in accordance with the information punched into the tape 231 and sensed by the fingers 232 through 239. The tree network 217 (FIG. 17) facilitates the application of controlling information to the wire guide control relay system 218 and the platform control relay system 219, shown in FIG. 18, and further facilitates the application of controlling information to the "AND" circuit relay control system 221 as shown in FIGS. 19 and 20. The tree network 217 further directs controlling information to the pair of binding tool control networks 251 as shown in FIG. 21. In addition, as shown in FIG. 16, the power source 241 provides operating potential for the platform drive 42 and the wire guide control mechanism 59 and further provides operating potential for the tape advance pulsing network wherein a pulse is provided to the tape reader mechanism 216 upon completion of each of various operations in a harnessing cycle in order that the tape mechanism may step the tape 231 to the next bit of information.

Initially, in the specific operation of the apparatus, an operator applies operating potential (not shown) for the tape reader motor 224 and for the platform drive motors 78 and 79 and further closes the power on switch 240; however, braking and clutching features previously discussed preclude the application of the driving force of motors 78 and 79 at this time. The wire guide 57 is normally resting at a central position along the bridging frame 58, wherein both double-acting air cylinders 127 and 136 are in the retracted position. The operator positions a plurality of strands of wire 31 from the supply reels 47 through the apertures 123 of the wire guide 57 and pulls the leading ends of the strands downwardly. Thereafter, the operator wraps the leading ends of the strands of wire 31 around a central post 63 on the left end of the platform 41, wherein the platform is normally positioned to the right in a nonoperative, rest condition. Thereafter, a pushbutton switch 252, as shown in FIG. 16, is momentarily closed to energize an electromagnet 253, thereby energizing the magnetic clutch 227 so that the drive motor 224 steps the roller 229 to position the first available punched information of the tape 231 in a position to be sensed by the fingers 232 through 239. As the pushbutton switch 252 is momentarily closed by an operator, a pulsing relay 254 is energized, whereby an associated contact 254a is closed so that an operating potential is applied to a delay relay 256. In addition, as the relay 254 is energized, an associated contact 254b is opened while the operation of relay 256 closes an associated contact 256a which is in series with the contact 254b. As the switch 252 is released, the relay 254 is de-actuated, whereby the associated contact 254a is opened to remove the operating potential from the delay relay 256. In addition, the contact 254b is closed and, although the relay 256 has been deactuated, an inherent delay characteristic of the relay 256 maintains the contact 256a in a closed condition for a predetermined period of time. During the period of time when the contact 256a is closed, subsequent to the deactuation of the relay 256, a complete circuit is connected between the positive potential of line 242 and the ground potential and includes the closed contact 254b, the closed contact 256a, a normally closed manual-operate switch 257, a tape depletion switch 258 and the electromagnet 253. During this period when the contact 256a remains closed the electromagnet 253 is energized to operate the magnetic clutch 227, whereby the motor 224 steps the tape 231 to align the first bit of information adjacent the sensing fingers 232 through 239.

In addition to the closure of the previously discussed contacts of relays 254 and 256, a pair of series connected contacts 254c and 256b, as shown in FIG. 16, are closed to provide operating potential for a reset relay 279. Relay 279 is provided with a plurality of associated contacts which are connected in various parts of the electrical control system for clearing conditions existing in the system prior to the initiation of a new cycle of operation. The contacts of relay 279 will be discussed hereinafter as each individual circuit of the control system is discussed. A contact 279a is closed upon the operation of the relay 279 and facilitates the application of operating potential to a pulsing relay 311. As the relay 311 is operated an associated contact 311a is closed whereupon, operating potential is applied to a delay relay 278. A normally closed contact 311b is connected in series with a normally open contact 278a where, upon the actuation of the relays 311 and 278, the contact 311b is opened and the contact 278a is closed. When the switch 252 is released, the contact 254c opens and the operating potential is removed from the reset relay 279, whereupon contact 279a is opened. As contact 279a is opened, the operating potential is removed from the relay 311 and the contact 311a is opened to remove the operating potential from the relay 278. Hence, the contact 311b reverts to the normally closed condition. However, due to an inherent delay characteristic of the delay relay 278, the contact 278a remains closed for a predetermined period of time. During this period when the contact 278a remains closed subsequent to the deactuation of relay 278, a pulsing path is completed which includes the positive potential of line 242, the normally closed contact 311b, the closed contact 278a, normally closed wire breakage detector switches 54a through 54h associated with the stems 54 (FIGS. 1 and 2), a normally closed semiautomatic operate switch 316, the normally closed manual-operate switch 257, the normally closed tape depletion switch 258, the electromagnet 253 and the ground potential. In this manner, energizing potential is supplied to the magnet 253 for energizing the clutch 227, whereby the tape 231 is stepped to the first bit of information. It is noted that the stepping pulse resulting from the operations of relays 311 and 278 coincides with the stepping pulse provided by the operation of relays 254 and 256 and such coincidence of pulse results in only a single stepping of the punched tape 231.

Figure 17:
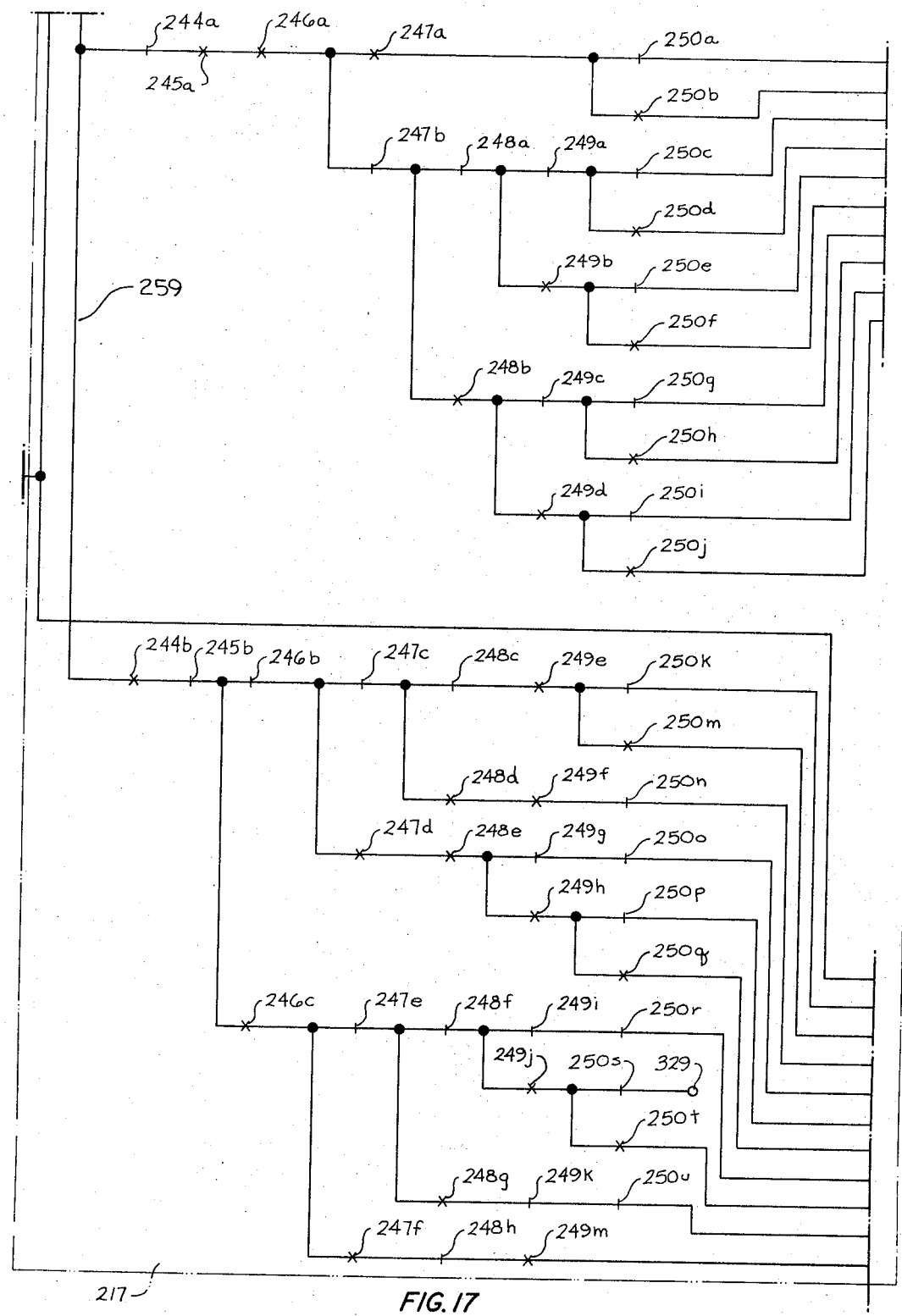

As the motor 224 steps the tape 231 into a first sensing position, the fingers 232, 233 and 238 sense punched apertures in the tape, whereby contacts 232a, 233a and 238a are closed. Closure of contacts 233a and 238a connects the relays 244 and 249 between the positive potential of line 242 and the ground potential. In addition, a common line 259 of the tree network 217 (FIG. 17) is connected through the contact 232a to the positive potential of the line 242. As the relays 244 and 249 are connected between the lines 242 and 243, the relays are energized, whereby contacts 244a and 244b are reversed from the normal condition shown in FIG. 17. In addition, as relay 249 is energized, associated contacts 249a through 249m are reversed from the normal condition as shown in FIG. 17. As the series connected contacts 244b and 249e are closed, a connection is completed between the positive potential of line 259 and the ground potential and includes the closed contact 244b, a normally closed contact 245b, a normally closed contact 246b, a normally closed contact 247c, a normally closed contact 248c, the closed contact 249e, a normally closed contact 250k and a wire guide back control relay 261 (FIG. 18) of the wire guide control relay system 218 which controls the center-to-rearward movement of the wire guide 57. As the back control relay 261 is operated, a pair of contacts 261a and 261b of the wire guide control mechanism 59 (FIG. 16) are closed, whereby two circuits are completed between the positive potential of line 242 and the ground line. Both circuits include normally closed contacts 262a and 263a of a platform drive right control relay 262 and a platform drive left control relay 263 of the platform control relay system 219 (FIG. 18). As viewed in FIG. 16, a first circuit is completed through the normally closed contact 262a, the normally closed contact 263a, the closed contact 261a and a wire guide back control solenoid 264. As the contact 261a is closed, the solenoid 264 is energized to position a valve 266 whereby pressure is applied to the double acting air cylinder 127 for normally retracting the piston rod 128. However, the air cylinder 127 is in the retracted position, therefore, the actuation of the solenoid 264 has no effect upon the operation of the air cylinder 127. The second circuit is completed through the normally closed contact 262a, the normally closed contact 263a, the closed contact 261b and a wire guide back control solenoid 267, whereby the solenoid is actuated. Upon actuation of the solenoid 267, a valve 268 is closed to supply pressure to the double acting air cylinder 136, whereby the piston rod 137 is urged from within the cylinder on a forward stroke. In this manner the wire guide 57 is moved from the center position, as shown in FIG. 8, to a rear position as previously described whereby the plurality of strands of wire 31 are distributed from the center post 63 to an adjacent rear cleat 61 as previously discussed and as shown in FIG. 4.

Three series-connected microswitches 269, 271 and 272, shown in FIG. 16, are positioned adjacent the path of travel of the wire guide 57. The switch 269 is positioned at the most rearward point of travel of the wire guide 57 and will be opened when the wire guide engages the contactor of the switch. The switch 271 is positioned centrally between the forward most and rearward most point of travel of the wire guide 57 and is opened when the wire guide engages the contactor of the switch. The switch 272 is positioned at the forward most point of travel of the wire guide 57 and is opened when the wire guide engages the contactor of the switch. Hence, when the wire guide 57 is resting at one of the three stations, forward, center, or back, the switch associated with the station at which the wire guide is resting will be open to preclude the application of an operating potential to the pulsing relay 254. However, as the wire guide is traveling from one station to another, the three switches 269, 271 and 272 will be closed, thereby completing a circuit which includes the relay 254, whereby the relay is energized; therefore, as the wire guide 57 is moved from the center position to the rearward most or back position, the previously open center switch 271 is closed to complete the energizing circuit for the relay 254. As the relay 254 is energized, the previously explained cycle related to the operation of the switch 252 occurs wherein the relay remains operated until the wire guide 57 engages the contactor and opens the rear switch 269. Thus the contact 256a remains closed for a predetermined period of time subsequent to the opening of the switch 269, whereby a pulsing potential is again applied to the electromagnet 253 to operate the clutch 227. In this manner, the next succeeding bit of information on the punched tape 231 is stepped to a position adjacent the sensing fingers 232 through 238. In addition, the reset relay 279 is again operated in the manner previously discussed due to the closure of contacts 254c and 256b.

Figure 22:
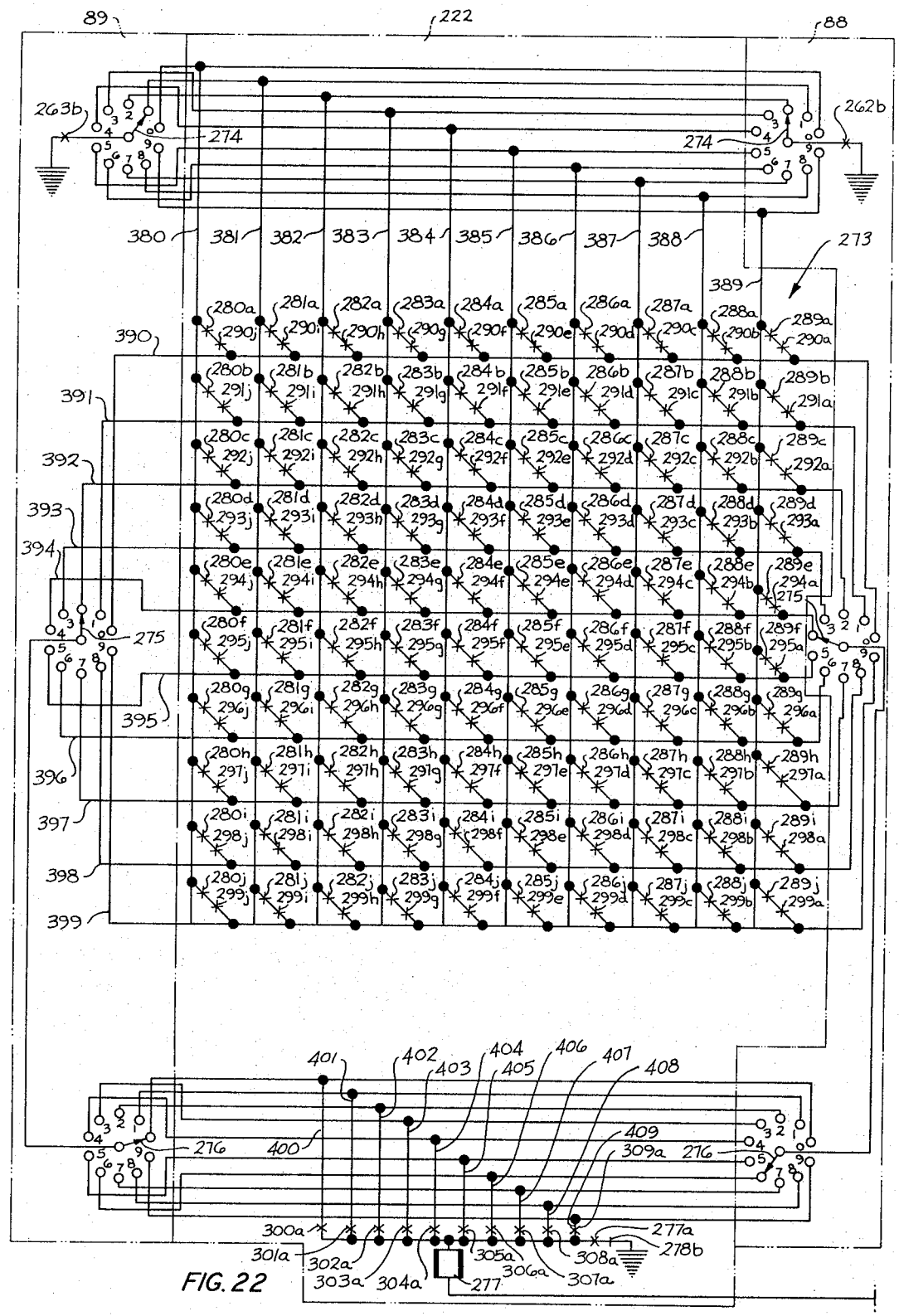

The structure and operation of the "AND" circuit 222 will be discussed to facilitate the discussion of succeeding operations subsequent to the movement of the wire guide 57 from the center to the rear positions as previously discussed. As shown in FIG. 22, the "AND" circuit 222 is provided with a matrix system, generally designated by the reference numeral 273, wherein each crosspoint of the matrix requires the actuation of a pair of relays to connect the matrix lines crossing at a given point. The vertical lines of the matrix 273 are designated 380 through 389 and are connected to contacts 280a–280j through 289a–289j, respectively, which are controlled by corresponding unit relays 280 through 289 (FIGS. 19 and 20). The horizontal lines are designated 390 through 399 and are connected to contacts 290a–290j through 299a–299j, respectively, which are controlled by corresponding tens relays 290 through 299 (FIGS. 19 and 20). As further shown in FIG. 22, each of the counters 88 and 89 are provided with rotating contactors 274, 275 and 276 for counting units, tens and hundreds digits, respectively. The contactor 274 of counter 88 is connected to a normally open contact 262b of the drive left relay 262, wherein the other side of the contact is connected to the ground potential. The contactor 274 of the counter 89 is connected to a normally open contact 263b of the drive right relay 263, wherein the opposite side of the contact is connected to ground potential. Each of the contactors 275 are connected to the respective contactors 276. The 0 through 9 terminals of the units portion of the counters 88 and 89 are connected to the vertical lines 380 through 389, respectively, of the matrix 273. The 0 through 9 terminals of the tens portion of the counter 88 are connected to one side of the horizontal lines 390 through 399, respectively, of the matrix 273 while the 0 through 9 terminals of the tens portion of the counter 89 are connected to the opposite side of the horizontal lines 390 through 399, respectively. Further, the 0 through 9 terminals of the hundreds portion of the counters 88 and 89 are connected to lines 400 through 409, respectively. The lines 400 through 409 are connected to normally open contacts 300a through 309a, respectively, of a corresponding plurality of hundred control relays 300 through 309 (FIGS. 19 and 20). One side of a platform stop relay 277 is connected in common to the opposite sides of the contacts 300a through 309a while the other side of the relay is connected to the positive potential of line 242. In addition, a normally open contact 277a is connected in series with a normally closed contact 278b of the delay relay 278 (FIG. 16), the common side of the contacts 300 through 309a and the ground potential to provide a locking path for the relay 277 when the relay is operated.

In order to stop the movement of the platform 41, a number is selected which is representative of the desired distance of travel of the platform and the number is stored in the "AND" circuit 222 by selection of the proper crosspoint of the matrix 273 to represent the units and tens digits of the number through operation of corresponding control relays 280 through 289 and relays 290 through 299, respectively, as shown in FIGS. 19 and 20. In addition, the hundreds digit of the number is selected through closure of one of the contacts 300a through 309a by operation of a corresponding one of the relays 300 through 309 (FIGS. 19 and 20). Assume that the number 642 is selected to represent the desired distance of travel of the platform 41 to the left from a position on the right to distribute the strands of wire 31 along one of the rows of cleats 61. Initially, the hundreds digit of the number is selected by closing the contact 306a which is connected through the line 406 to the number 6 terminal of the hundreds portion of the counter 88. Thereafter, the tens digit of the number is selected by operating one of a plurality of horizontal relays 290 through 299 (FIGS. 19 and 20) where, for example, the relay 294 is operated to close the contacts 294a–294j associated with the horizontal line 394 of the matrix 273 to condition the horizontal line 394 for selection of a crosspoint. In the selection of the unit digit of the number 642, one of a plurality of relays 280 through 289, for example relay 282, is operated to close the contacts 282a–282j. Hence, the contacts 282e and 294h are closed in series and the crosspoint associated with line 382 and 394 is connected, thereby completing a circuit between the number 2 terminal of the unit portion of the counter 88 and the number 4 terminal of the tens portion of the counter. As relay 262 is operated, the platform 41 moves and the contact 262b is closed to connect the ground potential to the contactor 274 of the counter 88. As the platform 41 is moved, the contactors 274, 275 and 276 of the counter 88 rotate in accordance with the movement of the platform as previously discussed and upon reaching a condition wherein the contactor 274 is in engagement with the number 2 units terminal, the contact 275 is in engagement with the number 4 tens terminal and the contactor 276 is in engagement with the number 6 hundreds terminal, whereby a path for application of the operating potential to the relay 277 is completed. The completed path includes the ground potential, the closed contact 262b, the number 2 units terminal, the line 382, the closed contacts 282e and 294h, the line 394, the contactor 275, the contactor 276, the line 406, the closed contact 306a, the relay 277 and the positive potential. As the relay 277 is energized, the contact 277a is closed to lock the relay in an operate condition. In addition, actuation of the relay 277 controls additional circuits to be discussed hereinafter to remove the drive force from the platform 41 and apply the brake 86.

Referring again to the movement of the wire guide 57 from the center to the back position, as the switch 271 is closed upon movement of the wire guide, relays 254 and 256 are operated as previously discussed. At this time, contacts 254c and 256b are again closed to operate the reset relay 279 in a manner previously described. In addition to previously discussed contacts associated with relay 279, a pair of normally open contacts 279b and 279c (FIG. 19) are closed to connect one side of a pair of control relays 312 and 313, respectively, to a line 314 which is connected to the positive potential of the power source 241 through the line 242. The opposite side of the relays 312 and 313 are connected to a ground potential where, upon the closure of contact 279b and 279c, operating potential is applied to the relays. As shown in FIGS. 19 and 20, a plurality of contacts 312a through 312u and 313a through 313u are connected in the "AND" circuit control system 221 to facilitate the connection of the positive potential line 259 (FIG. 17) to the relays 280–289, 290–299 and 300–309 for operation of the "AND" circuit 222 as previously described in accordance with information fed from the punched tape 231 through the tree network 217. In addition, a pair of contacts 312v and 313v are closed to lock the relays 312 and 313, respectively, in an operate condition. Subsequently, as the wire guide 57 engages and opens the back switch 269, the relay 279 is deactuated and the contacts 279b and 279c are opened. However, a locking circuit is complete for the relay 312 and includes the ground potential, the relay, the closed contact 312v, normally closed contacts 300b through 309b, a normally closed contact 279d and the positive potential of line 314. In addition, the locking circuit for the relay 313 is completed and includes the ground potential, the relay, the closed contact 313v, the normally closed contacts 290k through 299k, the normally closed contact 279e and the positive potential of line 314. As the relay 312 is operated, a normally open contact 312w, as shown in FIG. 16, is closed whereby operating potential is applied to a delay relay 317. In addition, a normally closed contact 312x is opened and a normally open contact 317a is closed. Further, as the relay 313 (FIG. 19) is operated, a normally open contact 313w, as viewed in FIG. 16, is closed, whereupon operating potential is applied to a delay relay 318. In addition, a normally closed contact 313x is opened and a normally open contact 318a is closed.

As the wire guide 57 reaches the rearwardmost position, the switch 269 is opened as previously described, whereby a stepping pulse is developed and the punched tape 231 is stepped to align the second bit of punched information adjacent the sensing fingers 232 through 238. Since the relays 312 and 313, as viewed in FIG. 19, have been operated due to operation of the reset relay 279, contacts 312a through 312u and contacts 313a through 313u, viewed in FIGS. 19 and 20, are reversed from a normal condition shown. In this manner, the "AND" circuit relay control system 221 is conditioned to receive information from the punched tape 231 for the selection of the hundreds digit of the number representing the desired distance of travel of the platform 41. Since the platform 41 is positioned to the right, it is now desirable to move the platform to the left to facilitate the distribution of the strands of wire 31 along the rear row of cleats 61. Prior to the movement of the platform 41 to the left, a number, representative of the desired distance of travel, which is measured in terms of the measuring units of the counters 88 and 89, is stored in the "AND" circuit 222 to facilitate the subsequent stopping of the platform after a desired distance of travel as previously discussed. In view of the impending movement of the platform 41 to the left, the counter 88 will be selected to provide coincidence information to the "AND" circuit 222 when the platform approaches the desired distance of travel. This is accomplished by the closing of the contact 262b, while the contact 263b remains open during this period in order that the rotating arrangement of the contactors of the counter 89 do not affect the operation of the platform stop relay 277. It is noted that the closure of contact 262b does not occur until the number has been stored in the "AND" circuit 222. Assuming that the number to be registered by the counter 88 is 721, the information on the punched tape 231 is transferred to the "AND" circuit relay control system 221 to store the hundreds digit of the number in the "AND" circuit 222. Referring to FIG. 16, the information of the punched tape 231 is in the form of apertures adjacent the sensing fingers 232, 234, 235, 237, 238 and 239, whereby contacts 232a, 234a, 235a, 237a, 238a and 239a, respectively, are closed. In this manner, the positive potential of line 242 is connected to line 259 (FIG. 17) of the tree network 217 and relays 245, 246, 248, 249 and 250 are operated. Referring to FIG. 17, as the relays 245, 246, 248, 249 and 250 are operated, associated contacts of the operated relays connected in the tree network 217 are reversed from the normal condition shown. Hence, in addition to other contacts, contacts 245a, 246a, 248b, 249d and 250j are closed. In this manner, operating potential is applied to the relay 307 (FIG. 19) through a complete circuit path which includes the positive potential of line 259, a normally closed contact 244a, the closed contact 245a, the closed contact 246a, the normally closed contacts 247b, the closed contacts 248b, 249d and 250j, of the tree network 217, as viewed in FIG. 17 and the closed contact 312s, the relay 307 and ground potential, as viewed in FIG. 19. As the relay 307 is operated, the normally open contact 307a, as viewed in FIG. 22, is closed to represent the storage in the "AND" circuit 222 of the hundreds digit of the number. In addition, as viewed in FIG. 19, contacts 307g and 307c are reversed from a normal condition shown, whereby the locking circuit for relay 312 is released due to the opening of the contact 307b, which removes the positive potential of line 314 from the relay. In addition, the closure of contact 307c connects one side of the relay 307 to the positive potential of line 314 through a normally closed contact 279d. In this manner, the relay 307 is locked in the operate condition to retain the storage of information in the "AND" circuit 222.

As the relay 312 is deactuated, the contact 312w, as viewed in FIG. 16, is opened to deactuate the relay 317. In addition, the contact 312x is closed and the contact 317a remains closed for a predetermined period of time due to an inherent delay characteristic of the relay 317. In this manner, a pulsing path is completed and includes the positive potential of line 242, the closed contacts 312x and 317a, the normally closed manual-operate switch 257, the normally closed tape depletion switch 258, the electromagnet 253 and the ground potential. The actuation of the electromagnet 253 energizes the magnetic clutch 227, whereby the punched tape 231 is stepped to align the next bit of information adjacent the sensing fingers 232 through 239. Subsequent to the stepping operation, the contact 317a opens to open the stepping pulse path. The punched tape 231 now provides information for storing the tens digit of the number in the "AND" circuit 222. As viewed in FIG. 16, the sensing fingers 232, 234, 235 and 238 sense apertures in the punched tape 31, whereby contacts 232a, 234a, 235a and 238a, respectively, are closed. As the contact 232a is closed, the positive potential of line 242 is connected to the line 259 (FIG. 17) of the tree network 217. As the contacts 234a, 235a and 238a are closed, the relays 245, 246 and 249, respectively, are operated, whereby associated contacts of the relays are reversed from a normal condition shown in FIG. 17 so that relay 292 (FIG. 20) is operated to store the tens digit of the number in the "AND" circuit 222 (FIG. 22). The actuation circuit for the relay 292 includes, as shown in FIG. 17, the positive potential of line 259, the normally closed contact 244a, the closed contacts 245a and 246a, normally closed contacts 247b and 248a, the closed contact 249b, normally closed contact 250e and, as viewed in FIG. 20, normally closed contact 312c, closed contact 313n, the relay 292 and the ground potential. As the relay 292 is operated, associated contacts 292a through 292j, as shown in FIG. 22, are closed. It is noted that the contacts 292a through 292j are connected to the crosspoints associated with the horizontal line 392 of the matrix 273. In addition, as viewed in FIG. 20, contacts 292k and 292m are reversed from a normal condition shown. The normally closed contact 292k is opened, whereby the locking circuit for the relay 313 is opened to remove the positive potential of line 314 from the relay whereby the relay is deactuated. The closure of contact 292m, connects the relay 292 to the positive potential of line 314 through normally closed contact 279e, whereby the relay is locked into an operate condition to facilitate the continued storage of the tens digit of the number in the "AND" circuit 222.

As the relay 313 is deactuated, the contact 313w, as shown in FIG. 16, is opened to deactuate the relay 318. In addition, the contact 313x is closed and the contact 318a remains closed due to inherent delay characteristics of the relay 318. In this manner, a pulsing circuit path is completed which includes the positive potential of line 242, the normally closed contact 313x, the delayed closed contact 318a, the normally closed manual-operate switch 257, the tape depletion switch 258, the electromagnet 253 and the ground potential. As the electromagnet 253 is actuated, the magnetic clutch 227 is energized, whereby the punched tape 231 is stepped to position the next bit of information adjacent the sensing fingers 232 through 239. The sensing fingers 232, 234, 235 and 239 sense apertures in the punched tape 231, whereby contacts 232a, 234a, 235a and 239a, respectively, are closed. As the contact 232a is closed, the positive potential of line 242 is connected to the line 259 (FIG. 17) of the tree network 217. As the contacts 234a, 235a and 239a are closed, the relays 245, 246 and 250, respectively, are operated, whereby associated contacts of the relays in the tree network 217 are reversed from a normal condition shown in FIG. 17. In this manner, the relay 281 (FIG. 20) is operated to store the unit digit of the number in the "AND" circuit 222. The actuation circuit for the relay 281 includes the positive potential of line 259, the normally closed contact 244a, the closed contacts 245a and 246a, the normally closed contacts 247b, 248a and 249a and the closed contact 250d, as viewed in FIG. 17, the normally closed contact 312b, the normally closed contact 313b, the relay 281 and ground potential, as viewed in FIG. 20. As the relay 281 is operated, associated contacts 281a through 281j, as viewed in FIG. 22, are closed. It is noted that the contacts 281a through 281j are connected to the crosspoints associated with the vertical line 381 of the matrix 273. It is further noted that the coincidence of closure of contacts 281c and 292i connects the crosspoint associated with the vertical line 381 and the horizontal line 392 of the matrix 273. In addition, contact 281k, as viewed in FIG. 20, is closed to connect the relay to the positive potential of line 314 through a normally closed contact 279f, thereby providing a locking circuit for the relay.

Referring to FIG. 16, a series of normally closed contacts 280m through 289m are connected in series with a pulsing relay 319 between the positive potential of line 242 and the ground potential. Hence, as the power-on switch 240 is closed, the relay 319 is operated, whereby normally open contact 319a is closed to facilitate the application of operating potential to a delay relay 321. In addition, a normally closed contact 319b is opened and a normally opened contact 321a is closed. As the relay 281 (FIG. 20) is operated, the contact 281m, as shown in FIG. 16, is opened to remove the operating potential from the relay 319, whereby the contact 319a opens to remove the operating potential from the relay 321. In addition, the contact 319b closes and the contact 321a remains closed for a predetermined period due to inherent delay characteristics of the relay 321. In this manner, energizing potential is provided for the electromagnet 253 through a path which includes the positive potential of line 242, the normally closed contact 319b, the delayed closed contact 321a, the manual-operate switch 257, the tape depletion switch 258, the electromagnet 253 and the ground potential. As the electromagnet 253 is energized, the magnetic clutch 227 is energized, whereby the punched tape 231 is stepped to align the next bit of information adjacent the sensing fingers 232 through 239. The fingers 232, 233, 236 and 237 sense apertures in the punched tape, whereby contacts 232a, 233a, 236a and 237a are closed. As contact 232a is closed, the positive potential appearing on line 242 is connected to line 259 (FIG. 17) of the tree network 217. In addition, as contact 233a, 236a and 237a are closed, relays 244, 247 and 248, respectively, are operated, whereby contacts associated with these relays in the tree network 217 are reversed from a normal condition shown in FIG. 17. Thus, normally open contacts 244b, 247d and 248e are closed, whereby the positive potential appearing on line 259 is applied to, and operates, the platform drive left relay 262 (FIG. 18) of the platform control relay system. The completed path for applying the positive potential to the relay 262 includes the positive potential of line 259, the closed contact 244b, the normally closed contacts 245b and 246b, the closed contact 247d and 248e, the normally closed contacts 249g and 250o, as shown in FIG. 17, and a normally closed contact 263c, the relay 262 and the ground potential as shown in FIG. 18. Referring further to FIG. 18, as the relay 262 is operated, an associated contact 262c is closed to complete a locking circuit for the relay. The path for the locking circuit of the relay 262 includes the positive potential coupled from line 242, a normally closed manual-operate switch 322 utilized for removing the positive potential from the line 314 during manual control of the apparatus, the closed contact 262c, a normally closed contact 279g, a normally closed contact 263c associated with the drive right relay 263, the relay 262 and the ground potential. It is noted that contact 262a (FIG. 16) is opened to preclude the accidental operation of the wire guide control mechanism 59.

Referring now to FIG. 16, as the relay 262 is operated, a pair of contacts 262d and 262e are reversed from a normal condition shown. As the contact 262e is opened, the operating potential is removed from a brake solenoid 323, whereby the brake 86 is released from locking engagement with the platform drive system 42. In addition, contact 262d is closed, whereby a left drive solenoid 324 is operated to operate the clutch 83, as shown in FIG. 6, whereby the driving force of the continuously operating left-drive motor 78 is coupled through the gearbox 81 to drive the platform 41 to the left as viewed in FIG. 1. The path for applying the operating potential to the left drive solenoid 324 includes the positive potential of line 242, the solenoid 324, the closed contact 262d, a normally closed contact 263d, a normally closed contact 279h, a normally closed contact 311c and the ground potential. In addition to the closure of the contacts of the relay 262 as discussed, the contact 262b, as shown in FIG. 22, is closed to condition the "AND" circuit 222 for operation of the platform stop relay 277 when the number registered by the counter 88 coincides with the number stored in the "AND" circuit 222 as previously discussed. As the platform 41 moves to the left, the contactors 274, 275 and 276 of the counters 88 and 89 are rotated due to the driving force of the continuously operating motor 78 coupled through the gear system as previously discussed. Since the contact 263b is open and the contact 262b is closed, the contactors of the counter 88 will provide coincidence information for the operation of the "AND" circuit 222. When the contactor 274 of counter 88 engages the number 1 terminal, the contactor 275 of the counter 88 engages the number 2 terminal and the contactor 276 of the counter 88 engages the number 7 terminal, a path is complete for applying operating potential to the platform stop relay 277. The completed path includes the positive potential, relay 277, the closed contact 307a, the line 407, contactor 276 of the counter 88, the contactor 275 of the counter 88, the horizontal line 392 of the matrix 273, the closed contacts 292i and 281c, the vertical line 381 of the matrix 273, contactor 274 of the counter 88, the closed contact 262b and the ground potential. Upon completion of the operating path by the coincidence of the registered number of the counter 88 and the stored number of the "AND" circuit 222, the platform stop relay 277 is operated. As the relay 277 is operated, the normally open contact 277a is closed, whereby a locking circuit for the relay is completed and includes the positive potential of line 242, the relay, the closed contact 277a, the normally closed contact 278b and the ground potential. Hence, as the platform 41 is moved to the left, the strands of wire 31 are distributed in the openings 62 of the rearward row of cleats 61.

Referring to FIG. 16, as the platform stop relay 277 is operated, a normally open contact 277b is closed to provide operating potential for the reset relay 279, whereby the contact 279a is closed to operate the relay 311. As the relay 279 is operated, a normally closed contact 279h is opened to remove the operating potential from the left drive solenoid 324. In addition, a normally open contact 279i is closed to provide the operating potential to the brake solenoid 323, whereby the clutch 83 disengages the driving force of the continuously operating motor 78 from the gear system and the brake 86 is applied to the gear system to provide an immediate stopping force for the platform 41. In addition, as relay 311 is operated, a normally closed contact 311c is opened and normally opened contact 311d is closed, whereby operating potential for the brake solenoid 323 is coupled through the contact 311d. Further, as viewed in FIG. 18, the normally closed contact 279g is opened to remove the operating potential from the left drive relay 262, whereby the contact 262d (FIG. 16) is opened and the contact 262e (FIG. 16) is closed. As viewed in FIG. 20, the normally closed contacts 279d, 279e and 279f are opened to remove the locking potential for the relays 307 (FIG. 19), 292 and 281, respectively. In addition, as viewed in FIG. 19, the normally open contacts 279b and 279c are closed to operate the relays 312 and 313, respectively, in the manner as previously discussed. The contact 262a (FIG. 16) is closed to condition the wire guide control mechanism 59 for the application of operating potential during the subsequent operation. Further, the contact 262b, as shown in FIG. 22 is opened to remove the ground potention from the contactor 274 of the counter 88. However, due to the locking circuit which includes the closed contacts 277a and 278b, the platform stop relay 277 remains in an operated condition. In addition, as the relays 281, 292 and 307 are deactuated, the contacts associated therewith are reversed to a normal condition shown in FIGS. 19, 20 and 22. Further, as the relay 281 (FIG. 20) is deactuated, the contact 281m, as shown in FIG. 16, is closed to operate the relay 319 in the manner as previously discussed.

As the relay 311 is operated due to the closure of contact 279a, the contact 311a is closed to operate the relay 278, whereby the contact 311b is opened and the contact 278a is closed. As the relay 278 is operated, the normally closed contact 278b (FIG. 22) is opened thereby opening the locking circuit for the platform stop relay 277. Referring to FIG. 16, as the relay 277 is deactuated, the contact 277b is opened to remove the operating potential for the relay 279, whereby the contact 279a is opened. As the contact 279a is opened, the relay 311 is deactuated and the contact 311a is opened to deactuate the delay relay 278. In addition, contact 311b is closed and contact 278 remains closed due to the inherent delay characteristics of the relay 278, whereby energizing potential is applied to the electromagnet 253 in the manner previously discussed. Further, as the relays 279 and 311 are deactuated, the remaining associated contacts of the relays are reversed to the normal conditions as shown throughout the schematic. As the electromagnet 253 is energized, the magnetic clutch 227 is energized, whereby the punched tape 231 is stepped to position the next bit of information adjacent the sensing fingers 232 through 239.

The sensing fingers 232, 233, 237 and 238 sense apertures in the punched tape 231, whereby contacts 232a, 233a, 237a and 238a are closed. As contact 232a is closed, the positive potential on line 242 is connected to the line 259 (FIG. 17) of the tree network 217. As the contacts 233a, 237a and 238a are closed, the relays 244, 248 and 249, respectively are operated, whereby contacts of the relays are reversed from a normal condition shown in FIG. 17. As the relays 244, 248 and 249 are operated, a wire guide forward relay 326 (FIG. 18) is operated through a path which includes the positive potential of line 259, the closed contact 244b, the normally closed contacts 245b, 246b and 247c, the closed contact 248d, the closed contact 249f, the closed contact 250n, as shown in FIG. 17, the relay 326 and the ground potential as shown in FIG. 18. Referring to FIG. 16, as the relay 326 is operated, a pair of normally open contacts 326a and 326b of the wire guide control mechanism 59 are closed. As the contact 326a is closed, a wire guide forward solenoid 327 is operated, whereby the valve 266 is positioned to apply pressure to the air cylinder 127 so that the piston rod 128 is urged from within the cylinder on a forward stroke. It is noted that the operating path for the solenoid 327 includes the positive potential of line 242, the normally closed contact 262a, the normally closed contact 263a, the closed contact 326a, the solenoid 327 and the ground potential. As the contact 326b is closed, an additional wire guide forward solenoid 328 is operated to position the valve 268, whereby pressure is supplied to the air cylinder 136 to move the piston rod 137 within the cylinder on a rearward stroke. Referring to FIG. 7, as the piston rod 128 is urged on a forward stroke from the air cylinder 136 and the piston rod 137 is moved within the cylinder 136, the sheaves 129 and 138, respectively, are moved from right to left, whereby the cord 162 is pulled substantially downwardly and the cord 159 is urged substantially upwardly. In this manner, the wire guide 57 is moved from the rearwardmost position to the forwardmost position, thereby distributing the strands of wire 31 from a cleat 61 near the right end of the platform 41 in the rearward row of cleats to an adjacent cleat 61 in the forward row of cleats.

Referring to FIG. 16, as the wire guide 57 is moved from the rearward position, the microswitch 269 is closed, whereby the relay 254 is operated in a manner previously described to close the contact 254a. In this manner, relay 256 is operated and contact 254b is opened while contact 256a is closed. As the wire guide 57 passes the center position switch 271, the switch is opened momentarily and the operating potential for the relay 254 is removed. At this time, the contact 254a opens to remove the operating potential from the relay 256 and the contact 254b closes while the contact 256a remains closed due to the delay characteristics of the relay 256. In this manner, a stepping pulse is provided for the electromagnet 253 in the manner as previously described, whereby the punched tape 231 aligns the next bit of information adjacent the sensing fingers 232 through 239. The sensing fingers 233, 236, 237 and 238 sense apertures in the punched tape 231, whereby contacts 233a, 236a, 237a and 238a, respectively, are closed. As the contacts 233a, 236a, 237a and 238a are closed, the relays 244, 247, 248 and 249 are operated, whereby associated contacts in the tree network 217 (FIG. 17) are reversed from a normal condition shown. In this manner, a circuit is complete between the lines 259, the closed contact 244b, the normally closed contacts 245b and 246b, the closed contacts 247d, 248e, 249h and the closed contact 250p, are connected to a terminal 239, wherein the terminal is not connected to any other portion of the electrical control system. Thus, the information of the punched tape supplied to the apparatus as the wire guide 57 passes the center position switch 271, instructs the machine that no operation other than the continued forward movement of the wire guide is to be accomplished at this time. Referring to FIG. 16, as the wire guide continues through the center position, the switch 271 is closed whereby the relays 254 and 256 are again operated as previously discussed. As the wire guide reaches the forwardmost position, the forward position switch 272 is opened to deactuate the relays 254 and 256 providing the stepping pulse for the electromagnet 253 in the manner as previously discussed. In this manner, the punched tape 231 is stepped to a position where the next bit of information is aligned with the sensing fingers 232 through 239.

At this time, the platform 41 is positioned to the left, referring to FIG. 1, and the next step will be to move the platform to the right. Due to the forward position of the wire guide 57, the strands of wire 48 will be distributed along the forward row of cleats 61 as the platform is moved to the right. The punched tape 231 now successively supplies information to the "AND" circuit relay control system 221 (FIGS. 19 and 20) to set up a stored number in the "AND" circuit 222 (FIG. 22) in the same manner previously discussed. Upon completion of the unit digit of the number, subsequent to the storage of the hundreds and tens digits, the punched tape 231 is stepped to a position whereby the sensing fingers 232, 233, 235 and 238 sense apertures in the tape to operate contacts 232a, 233a, 235a and 238a. As the contact 232a is closed, the positive potential of the line 242 is connected to the line 259 (FIG. 17) of the tree network 217. In addition, the closure of contacts 233a, 235a and 238a results in the operation of relays 244, 246 and 249, whereby related contacts in the tree network 217 are reversed from the normal condition shown in FIG. 17. As the relays 244, 246 and 249 are operated, the platform drive right relay 263 (FIG. 18) is operated. The operating path for the relay 263 includes the positive potential of line 259, the closed contact 244b, the normally closed contact 245b, the closed contact 246c, the normally closed contacts 247e and 248f, the closed contact 249j, the normally closed contact 250s, as viewed in FIG. 17, a normally closed contact 262f, the relay 263 and the ground potential as shown in FIG. 18. As the relay 263 is operated, a contact 263f is closed to provide a locking circuit for the relay and the locking circuit path includes the positive potential connected to line 242 (FIG. 16), the manual-operate switch 322, the closed contact 263f, a normally closed contact 279j, the normally closed contact 262f, the relay 263 and the ground potential.

Referring to FIG. 16, as the relay 263 is operated, the contact 263a is opened to preclude the possibility of accidental operation of the wire guide control mechanism 59 during movement of the platform 41. In addition, the contact 263d is opened to remove the operating potential for the brake solenoid 323 and the contact 263e is closed to provide operating potential for a platform right drive solenoid 331. The complete path for the operate circuit of the right drive solenoid 331 includes the positive potential of line 242, the right drive solenoid, the closed contact 263e, the normally closed contact 279h, the normally closed contact 311c and the ground potential. In addition, the contact 263b (FIG. 22) is closed to connect the ground potential to the contactor 274 of the counter 89 for subsequent operation of the platform stop relay 277 in a manner similar to that previously discussed in relation to the operation of the counter 88. As the brake solenoid 323 is de-energized, the brake 86, (FIG. 6) is removed from locking engagement with the platform driving mechanism. In addition, as viewed in FIG. 6, the clutch 84 is operated as the right drive solenoid 331 is energized, whereby the driving force of the continuously operating right drive motor 79 is coupled through the gearing system to the platform 41 to drive the platform to the right. As the platform 41 is moved to the right, the strands of wire 31 are distributed along the front row of cleats 61. Subsequently, the registered number of the counter 89 coincides with the stored number of the "AND" circuit 222, whereby the platform stop relay 277 is operated in the manner previously discussed. Thereafter, the contact 277b, as viewed in FIG. 16, is closed to operate the relay 279, whereby the operating potential is removed from the right drive solenoid 331 to disengage the clutch 84 from the driving force of the motor 79 and the contact 279i is closed to actuate the brake solenoid 323, whereby the brake 86 is applied to the driving system to provide a positive stop for the platform 41. In addition, relays 311 and 278 are operated as previously discussed to provide a stepping pulse for the electromagnet 253 and for further controlling the contacts 311c and 311d of the platform driving mechanism 42. Further, operation of the relay 279 clears the locked relays of the "AND" circuit relay control system 221 (FIGS. 19 and 20) and also opens the contact 279j (FIG. 18) for opening the locking circuit of the relay 263, whereby the relay is deactuated. Deactuation of the relay 263 results in the opening of contact 263b as shown in FIG. 22, whereby the ground potential is removed from the contactor 274 of the counter 89. In addition, operation of relay 278 opens the contact 278b (FIG. 22) for releasing the locked relay 277. As the relay 277 is deactuated, the contact 277b, as shown in FIG. 16, is opened to deactuate the relay 279. As the relay 279 is deactuated, the associated contacts of the relay revert to a normal condition as shown in the electrical control circuit. In addition, relays 311 and 278 are deactuated, wherein a stepping pulse is applied to the electromagnet 253 so that the tape 231 is stepped to align the next bit of information adjacent the sensing fingers 232 through 239.

The sensing fingers 232, 233, 238 and 239, as viewed in FIG. 16 sense apertures in the punched tape 231, whereby contacts 232a, 233a, 238a and 239a, respectively, are closed. As the contact 232a is closed, the positive potential appearing on line 242 is connected to the line 259 (FIG. 17) of the tree network 217. As the contacts 233a, 238a and 239a are closed, the relays 244, 249 and 250, respectively are operated, whereby related contacts in the tree network 217 are reversed from a normal condition shown in FIG. 17. In this manner, a wire guide center relay 332 (FIG. 18) is actuated, whereby the actuating path for the relay includes the positive potential of line 259, the closed contact 244b, the normally closed contacts 245b, 246b, 247c and 248c, the closed contact 249e, the closed contact 250m, as shown in FIG. 17, the relay 332 and the ground potential, as shown in FIG. 18. Referring to FIG. 16, as the relay 332 is actuated, a contact 332a in the wire guide control mechanism 59 is closed. As the contact 323a is closed, an energizing path for the wire guide back solenoid 264 is completed and includes the positive potential of line 242, the normally closed contacts 262a and 263a, the closed contact 332a, the solenoid 264 and the ground potential. As the solenoid 264 is energized, the valve 266 is positioned to supply pressure to the air cylinder 127, whereby the piston rod 128, as viewed in FIG. 7, is withdrawn into the cylinder on a rearward stroke. In this manner, the sheave 129 is moved from left to right, as viewed in FIG. 7, whereby the cord 162 is moved upwardly and the wire guide 57 is moved from a forward to a center position. Hence, the wire guide 57 is moved from a position over a forward row cleat 61 to a position to the left, as viewed in FIG. 1, of a center post 63, thereby distributing the strands of wire 31 therealong.

Referring further to FIG. 16, as the wire guide 57 is moved from the forward position, the switch 272 is closed, whereby the relays 254 and 256 are operated in the manner previously described. In addition, contact 254b is opened and contact 256a is closed. As the wire guide 57 reaches a center position, the switch 271 is opened, whereby the relays 254 and 256 are deactuated as previously discussed. Thereafter, contact 254b is closed and contact 256a remains closed for a predetermined period of time due to the delay characteristics of the relay 256. In this manner, an energizing pulse is provided for the electromagnet 253 and the punched tape 231 is stepped to align the next bit of information adjacent the sensing fingers 232 through 239. The sensing fingers 232, 233 and 235 sense apertures in the punched tape 231, whereby contacts 232a, 233a and 235a are closed. Upon the closing of contact 232a, the positive potential appearing on line 242 is connected to the line 259 (FIG. 17) of the tree network 217. Further, closure of contacts 233a and 235a result in the operation of relays 244 and 246, respectively, whereby related contacts in the tree network 217 are reversed from a normal condition shown in FIG. 17. In this manner, a wire guide skip right relay 333 (FIG. 18) is operated. The operating path for the relay 333 includes the positive potential of line 259, the closed contact 244b, the normally closed contact 245b, the closed contact 246c, the normally closed contacts 247e, 248f, 249i and 250r, as viewed in FIG. 17, the relay 333 and the ground potential as viewed in FIG. 18. Referring to FIG. 16, as the relay 333 is operated, a contact 333a in the wire guide control mechanism 59 is closed, whereby a wire guide skip right solenoid 334 is energized to position a valve 336 for supplying pressure to the air cylinder 169, as shown in FIG. 7, so that the wire guide 57 skips to the right, as viewed from the front of the apparatus (FIG. 1) in the manner as previously discussed. As the wire guide 57 skips to the right, the strands of wire 31 are distributed between the furcations of the center post 63 and the wire guide is resting at a position substantially to the right and above the center post as viewed in FIG. 1.

A pair of microswitches 337 and 338 are connected in series with a pulsing relay 339 in the pulsing network 223 and are open when the wire guide 57 is resting in either the skip right or skip left position, respectively. Hence, during the normal operation of the distribution of the strands of wire 31, prior to and preceding the skip right operation, the wire guide 57 is normally positioned in the skip left position, whereby the switch 338 remains open. As the wire guide 57 is skipped to the right, as previously discussed, the switch 338 is closed, whereby operating potential is applied to the pulsing relay 339 through a path which includes the positive potential of line 242, the closed contacts 337 and 338, the relay 339 and the ground potential. It is noted that the contact 339a associated with the relay 339 is connected in series with a delay relay 341 where, upon the closure of the power-on switch 240, the delay relay 341 is operated. As the relay 339 is operated, the contact 339a is opened, whereby operating potential is removed from the delay relay 341. In this manner, normally open contact 339b is closed and a closed contact 341a remains closed for a given period of time due to the inherent delay characteristics of the relay. As the contact 339b is closed, an energizing path for the electromagnet 253 is completed and includes the positive potential of line 242, the closed contacts 239b and 341a, the manual-operate switch 257, the tape depletion switch 258, the electromagnet 253 and the ground potential. As the electromagnet 253 is energized, the punched tape 231 is stepped to align the next bit of information adjacent the sensing fingers 232 through 239. Subsequently, the wire guide 57 reaches the skip right position, whereby the switch 337 is opened. As the switch 337 is opened, the operating potential for the relay 339 is removed and the contact 339a is closed so that the operating potential is applied to the relay 241. In addition, the contact 339b is opened to remove the stepping pulse for the electromagnet 253. It is noted that the period of closure of the contact 341a, subsequent to the removal of the operating potential for the delay relay 349, could also function to control the removal of the energizing pulse for the electromagnet 253. Hence, in this instance, either the movement of the controlled element, such as the skipping of the wire guide 57, or the opening of the delayed contact, for example 341a, could control the stepping of the tape 231.

As the tape 231 is stepped, the sensing fingers 232, 233 and 238 sense punched apertures in the tape, whereby contacts 232a, 233a and 238a, respectively are closed. As the contact 232a is closed, the positive potential appearing on line 242 is connected to the line 259 (FIG. 17) of the tree network 217. Further, closure of the contacts 233a and 238a result in the application of operating potential to the relays 244 and 249, respectively, whereby associated contacts in the tree network 217 are reversed from a normal condition shown in FIG. 17. In this manner, operating potential is applied to the wire guide back relay 261 (FIG. 18) through a path which includes positive potential of line 259, the closed contact 244b, the normally closed contacts 245b, 246b, 247c and 248c, the closed contact 249e, the normally closed contact 250k, as viewed in FIG. 17, the back relay 261 and ground potential, as viewed in FIG. 18. Referring to FIG. 16, as the relay 261 (FIG. 18) through a path which includes positive potential the contact 261a is closed, the wire guide back solenoid 264 is energized to position the valve 266 in the same manner previously discussed, whereby pressure is supplied to the air cylinder 127 for a rearward stroke of the piston rod 128. Since the piston rod 128 is already resting in the rearward position, there will be no additional movement of the rod. As contact 261b is closed, the wire guide back solenoid 267 is energized in the manner previously described, whereby the valve 268 is positioned to supply pressure to the air cylinder 136. In this manner, the piston rod 137 is drawn within the cylinder 136 on a rearward stroke, whereby the wire guide 57 is moved from the center position, on the right and above the center post 63, to the rearward position as previously discussed. As the wire guide 57 is moved from the center position, the switch 271 closes, whereby the relays 254 and 256 are operated to condition the pulsing circuit 223 for the application of an energizing pulse for the electromagnet 253 when the wire guide reaches the rearwardmost or back position. Subsequently, the wire guide 57 moves to the rearward position, whereby the switch 269 is opened and the relays 254 and 256 are deactuated. In this manner, the energizing pulse is provided for the electromagnet 253, whereby the punched tape 231 is stepped to align the next bit of information adjacent the sensing fingers 232 through 239. Hence, the strands of wire 31 are distributed from the right side of the center post 63 to a position to the right of an adjacent rear cleat 61.

As the punched tape 231 is moved into position, the sensing fingers 232, 233, 235, 238 and 239 sense apertures in the punched tape, whereby the contacts 232a, 233a, 235a, 238a and 239a, respectively, are closed. As the contact 232a is closed, the positive potential appearing on line 242 is connected to the line 259 (FIG. 17) of the tree network 217. As the contacts 233a, 235a, 238a and 239a are closed, the relays 244, 246, 249 and 250, respectively, are operated, whereby associated contacts in the tree network 217 are reversed from a normal condition shown in FIG. 17. In this manner, operating potential is applied to a wire guide skip left relay 342 (FIG. 18) through a path which includes the positive potential of line 259, the closed contact 244b, the normally closed contact 245b, the closed contact 246c, the normally closed contacts 247e and 248f, the closed contact 249j, the closed contact 250t, as shown in FIG. 17, the relay 342 and the ground potential as shown in FIG. 18. Referring to FIG. 16, as the relay 342 is closed, a contact 342a in the wire guide control mechanism 59 is closed to provide energizing potential for a wire guide skip left solenoid 343 through a path which includes the positive potential of line 342, the normally closed contacts 262a and 263a, the closed contact 342a, the solenoid 343 and the ground potential. As the solenoid 343 is energized, the valve 336 is positioned to supply pressure to the air cylinder 169 for withdrawing the piston rod 171 into the air cylinder on a rearward stroke from left to right as shown in FIGS. 7 and 11. In this manner, the wire guide is skipped from the right to the left, as viewed from the front of machine (FIG. 1). As the wire guide 57 is skipped to the left, the switch 337 is closed, whereby operating potential is applied to the pulsing relay 339 through the closed switches 337 and 338, whereupon relay 341 is deactuated and the pulsing network is conditioned for a subsequent energizing pulse for the electromagnet 253 as previously described. As the wire guide 57 completes the skip left movement, the switch 338 is opened, thereby removing the operating potential for the relay 339, whereby the energizing pulse is applied to an electromagnet 253 in the manner previously described. In this manner, the punched tape 231 is stepped to align the next bit of information adjacent the sensing fingers 232 through 239. Thereafter, a number is stored in the "AND" circuit 222 (FIG. 22) in the manner as previously described and the platform driving mechanism 42 is operated to move the platform to the left, thereby starting a new cycle which is accomplished in the same manner as the cycle previously discussed. Thus, the necessary skip of the strands of wire 31 at the completion of one wrapping cycle from a center post 63 to a rear post 61 positioned diagonally to the right of the center post, as viewed in FIG. 3, is accomplished by the skip motion of the wire guide 57. Subsequently, a plurality of wrapping cycles are completed, wherein the travel of the platform to the right and the left decreases upon each successive movement thereof. In this manner, the strands of wire 31 are wrapped around the cleats 61 in accordance with the pattern displayed in FIG. 4.

At this time, the wire guide 57 is resting in the center position and the punched tape 231 is positioned so that sensing fingers 232, 233 and 236 through 239 sense apertures in the tape, whereby contacts 232a, 233a and 236a through 239a, respectively, are closed. As the contact 232a is closed, the positive potential appearing on line 242 is connected to the line 259 (FIG. 17) of the tree network 217. In addition, as the contacts 233a and 236a through 239a are closed the relays 244 and 247 through 250, respectively, are operated, whereby associated contacts in the tree network 217 are reversed from a normal conition shown in FIG. 17. In this manner, operating potential is applied to an on-bell, end of cycle relay 344 (FIG. 18) through a path which includes the positive potential of line 259, the closed contact 244b, the normally closed contacts 245b and 246b, the closed contacts 247d, 248e, 249h and 250q as shown in FIG. 17, the relay 344 and the ground potential as shown in FIG. 18. Referring to FIG. 18, as the relay 344 is operated, a normally open contact 344a is closed, whereby operating potential is applied to an end of cycle bell 346. The circuit path for applying the operating potential for the bell 346 includes the positive potential of line 242, the normally closed manual-operate switch 322, the closed contact 344a, a normally closed toggle switch 347, which is utilized to manually remove the operating potential from the bell, the bell 346 and the ground potential. In addition, a normally open contact 344b is closed to complete a locking circuit for the relay 344 which includes the positive potential of line 242, the manual-operate switch 322, a normally closed contact 348a associated with an off-bell relay 348, the closed contact 344b, the relay 344 and the ground potential. Further, as viewed in FIG. 16, a normally open contact 344c is closed, whereby an energizing pulse is applied to the electromagnet 253 through a circuit path which includes the positive potential of line 242, the closed contact 344c, the normally closed wire breakage detector switches 54a through 54i, the normally closed semi-automatic manual-operate switch 316, the normally closed manual-operate switch 257, the normally closed tape depletion 258, the electromagnet 253 and the ground potential. In this manner, the punched tape 231 is stepped to align the next bit of information adjacent the sensing fingers 232 through 239, whereby the sensing fingers 232, 233, 235, 236 and 238 sense apertures in the tape and contacts 232a, 233a, 235a, 236a and 238a, respectively, are closed. As the contacts 232a is closed, the positive potential appearing on line 242 is connected to the line 259 (FIG. 17) of the tree network 217. In addition, as the contacts 233a, 235a, 236a and 238a are closed, operating potential is applied to the relays 244, 246, 247 and 249, respectively, whereby related contacts in the tree network 217 are reversed from a normal condition shown in FIG. 17. In this manner, operating potential is applied to the off-bell relay 348 (FIG. 18) through a circuit path which includes positive potential of the line 259, closed contact 244b, the normally closed contact 245b, the closed contacts 246c and 247f, the normally closed contact 248h, the closed contact 249m, as viewed in FIG. 17, the relay 348 and the ground potential as viewed in FIG. 18. As the off-bell relay 348 is operated, the normally closed contact 348a is opened, whereby the locking path for the on-bell relay 344 is opened to deactuate the relay 344. In this manner the contact 344a is opened and the operating potential for the bell 346 is removed. At this time, the wire guide 57 is resting at the center position and the platform 41 is positioned centrally between the extreme ends of the table frame 39. The operator severs the trailing portion of the strands of wire 31 which extends from the centrally positioned wire guide 57 and thereafter wraps the trailing end of the severed strands around a furcation of a center post 63 located beneath the wire guide.

Subsequent to the wrapping operation, the tape-controlled binding operation is to be initiated for binding the wrapped strands of wire 31 adjacent each cleat 61 along the forward and rear rows of cleats. As previously discussed, a pair of binding tools 64, such as the binding tools disclosed in our previously mentioned copending application, are positioned adjacent the forward and rear rows of cleats 61. As shown in FIG. 21, the control circuits 251 for each binding tool 64 are identical, therefore, operation of only one will be explained. The operator closes the pushbutton switch 252 to step the punched tape 231 in the manner previously discussed whereby the sensing fingers 232, 233, 235 and 237 sense punched information in the tape. As the finger 232 engages the apertures of the punched tape, contact 232a is closed to connect the positive potential of the line 242 to the line 259 (FIG. 17) of the tree network 217. In addition, as the sensing fingers 233, 235 and 237 sense the apertures in the punched tape 231, contacts 233a, 235a and 237a, respectively, are closed, whereby operating potential is applied to the relays 244, 246 and 248, respectively. In this manner, contacts of the relays 244, 246 and 248 are reversed from a normal condition shown in FIG. 17, whereby operating potential is applied to a binder starting relay 349 (FIG. 21) through a path which includes the positive potential of line 259, the closed contact 244b, the normally closed contact 245b, the closed contact 246c, the normally closed contact 247e, the closed contact 248g, the normally closed contacts 249k and 250u, as shown in FIG. 17, the relay 349 and the ground potential, as shown in FIG. 21. Referring to FIG. 21, as the relay 349 is operated, a normally open contact 349a is closed, thereby locking the relay in an operate condition through a path which includes the positive potential of line 242, the closed contact 349a, a normally closed contact 351a of a binding tool return relay 351, the relay 349 and the ground potential. In addition, as the relay 349 is operated, a normally open contact 349b is closed to operate a tool forward solenoid 252, wherein the solenoid is connected between the positive potential of line 242 and the ground potential. In addition, a normally open contact 349c is closed for subsequent operation of a tool starting relay 356. As the solenoid 352 is energized, a valve 353 is positioned to supply pressure to the double-acting air cylinder 183 (FIG. 12), whereby the piston rod 184 is urged from within the cylinder on a forward stroke. In this manner, the binding tool 64 is moved from a position of rest as shown in the left phantom view of FIG. 12 to a binding position shown in solid lines. As the binding tool 64 reaches a position as shown in solid lines in FIG. 12, a microswitch 354 is closed, whereby operating potential is applied to the tool starting relay 356 through a path which includes the positive potential of line 242, the relay 356, the closed contact 349c, a normally closed contact 357a of a release relay 357 and the ground potential. As the relay 356 is operated, a normally open contact 356a is closed to energize a solenoid 358. In addition, a normally closed contact 356b is opened. As the solenoid 358 is energized, a valve 359 is positioned to supply pressure to the rotating air motor 176 (FIG. 12) of the binding tool 64, whereby the binding tool is operated to bind the strands of wire 31 adjacent one of the cleats 61. As the binding tool is initially operated, a microswitch 361 is closed due to movement of the slidable hook 177, whereby the release relay 357 is operated through a path which includes the positive potential of line 242, the relay 357, the closed switch 361 and the ground potential. As the relay 357 is released, the contact 357a is opened to release the relay 356, whereby the contact 356a is opened to remove the energizing potential for the solenoid 358. As the solenoid 358 is de-energized, the valve 359 is moved to a position of rest while the binding tool 64 remains in an operate condition. In addition, a normally closed contact 357b is opened in one circuit path and a normally open contact 357c is closed in another circuit path to operate the relay 351, wherein the operating path for the relay includes the positive potential of line 242, the relay 351 the closed contact 357c and the ground potential. As the relay 351 is operated, the normally closed contact 351a is opened to remove the operating potential for the relay 349. In addition, a normally open contact 351b is closed to provide a locking path for the relay 351 which includes the positive potential of line 242, the relay 351, the closed contact 351b, the closed switch 354 and the ground potential. Further, a normally open contact 351c is closed. As the relay 349 is deactuated, the contact 349b is opened to remove the energizing potential from the solenoid 352, whereby the valve 353 is moved to a position of rest. Due to the fact that the air cylinder 183 is a double-acting air cylinder, the binding tool 64 will remain in the forward operate position. In accordance with the operation of the binding tool 64, as discussed in our previously mentioned copending application, the hook 177 is moved away from the housing 174 upon completion of the binding operation, whereby the switch 361 is opened. As the switch 361 is opened, the relay 357 is deactuated, whereby contacts 357a and 357b revert to a normally closed condition, and contact 357c is opened. However, due to the closure of contact 351b and the switch 354, the relay 351 remains operated subsequent to the opening of the contact 357c. As the contact 357b is closed, a tool cut-off solenoid 362 and a tool return solenoid 363, which are connected in parallel, are energized through a path which includes the positive potential of line 242, closed contact 351c, the normally closed contacts 357b and 356b, the shunt connected solenoids 362 and 363 and the ground potential. As the solenoid 362 is energized, the valve 359 is positioned to remove the air supply for the rotating air motor 176 (FIG. 12). In addition, energizing of the solenoid 363 positions the valve 353, whereby pressure is supplied to the air cylinder 183 (FIG. 12) to retract the binding tool 64 to a position shown in the left phantom view of FIG. 12. Referring to FIG. 16, a pair of microswitches 364 and 366 are positioned adjacent the withdrawn positions of the respective binding tools 64, whereby the switches are open when the binding tools are in a rest position as shown in the left phantom view of FIG. 12. Hence, as the binding tools 64 are moved to a binding position, the switches 364 and 366 are closed, whereby operating potential is applied to a pulsing relay 367. As the pulsing relay 367 is energized, a normally open contact 367a is closed to facilitate the application of operating potential to a delay relay 368. In addition, a normally closed contact 367b is opened and a normally open contact 368a is closed. Upon completion of the binding operation, the binding tools 64 return to a normal position of rest as shown in the left phantom view of FIG. 12, whereby the switches 364 and 366 are opened so that the operating potential is removed from the relay 367. It is noted that the switches 364 and 366 are connected in parallel to preclude the premature removal of operating potential from the relay 367 in the event one binding tool 64 reaches a position of rest prior to the other binding tool reaching the rest position. As the operating potential is removed, the relay 367 and contact 367a is opened, thereby removing the operating potential from the relay 368. In this manner, the open contact 367b is closed and the contact 368a remains closed for a predetermined period of time due to the inherent delay characteristics of the relay 368. Thus, the punched tape 231 is stepped to align the next bit of information adjacent the sensing fingers 232 through 239, whereby information is supplied to the platform drive mechanism 42 for moving the platform 41 to a position wherein the binding tools 64 are adjacent the next group of strands of wire 31 to be bound. Thereafter the punched tape 231 is stepped to provide information for operating the binding tools 64 in the manner as previously discussed. Successive binding operations are completed in the manner described, wherein the harnessed strands of wire 31 are bound in accordance with information supplied by the punched tape 231 in the manner as shown in FIG. 4.

Figure 13:
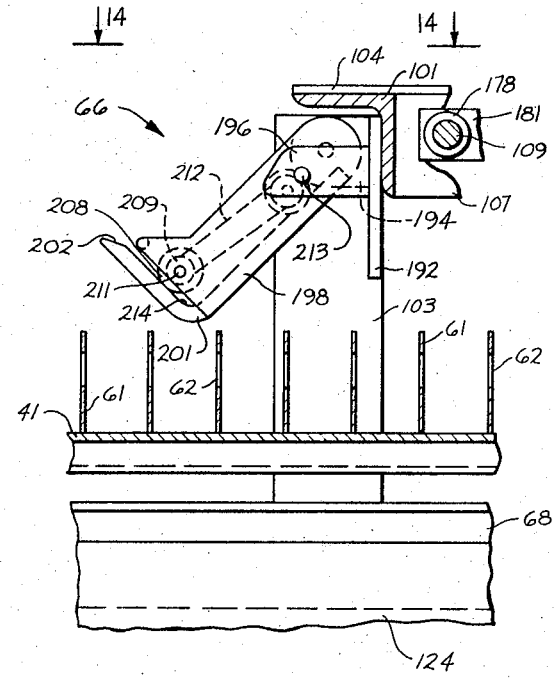
FIG. 13 is a sectional view taken along line 13—13 of FIG. 8 showing a cutting mechanism for cutting strands of wire subsequent to the wrapping of the strands about supporting elements.
Figure 14:
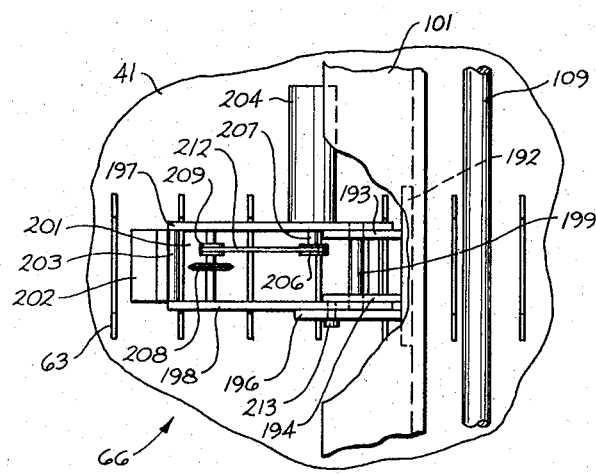
FIG. 14 is a sectional view taken along line 14—14 of FIG. 13 showing various details of the cutting mechanism.

The final operation involves the severing of the strands of wire 31 between the furcations of the center posts 63, whereby the platform 41 must be positioned to the left, referring to FIG. 1, prior to the cutting operation. Upon completion of the binding operation, the operator depresses a manual-operate pushbutton switch 369, as viewed in FIG. 18, whereby the switch 322 is opened and the positive potential of line 242 is connected to a manual control circuit for the platform 41. A normally open manual-operate switch 371 is connected in series with the relay 263 to facilitate manual control of movement of the platform 41 to the right as viewed in FIG. 1. In addition, a normally open manual-operate switch 372 is connected in series with the relay 262 to facilitate the manual control of movement of the platform 41 to the left as viewed in FIG. 1. In the event the platform 41 has moved to the right during the binding operation, the operator depresses the manual-operate switch 369 and the manual-operate switch 372, whereby operating potential is applied to the relay 262 to operate the drive system 42 so that the platform 41 is moved to the left. It is noted that the normally closed, manual-operate switch 257 (FIG. 16) is opened to preclude the possibility of application of a stepping pulse to the stepping magnet 253 (FIG. 16). The operation of the control circuit for movement of the platform 41 is substantially similar to the operation previously discussed. Since the platform 41 must be positioned to the left prior to the cutting operation, there is no necessity for closing the switch 372 which controls the movement to the left of the platform in the event the platform is resting in a position to the left, as shown in FIG. 1, subsequent to the binding operation. Referring to FIGS. 13 and 14, subsequent to the positioning of the platform 41 to the left, as viewed in FIG. 1, the operator withdraws the locking pin 213 of the cutting mechanism 66 and pivots the mechanism downwardly to a position shown in the phantom view of FIG. 13. In this manner, the beveled guide foot 202 is positioned in a horizontal plane which is slightly below the plane of the strands of wire 31 passing between the furcations of the center posts 63 and further where the slot 214 is substantially aligned with the strands of wire. Thereafter, the operator applies operating potential (not shown) to the electric motor 204 for rotating the cutting wheel 208. Subsequently, the operator closes the manual-operate switch 371 to facilitate movement of the platform 41 to the right, whereby the strands of wire 31 are guided into the slot 214 over the beveled foot 202 and are severed by the rotating cutting wheel 208. Subsequent to the cutting operation, the completed twin pair of cable harnesses are removed from the machine to reveal the finished product 38 as shown in FIG. 5.

It is noted that the counters 88 and 89 are set and the gears 91, 92, 93, 94, 97 and 77 are so selected that the number registered on the counters bears direct relationship to the distance between the left end of the platform 41 and wire guide 57. Thus, a given number will always refer to the same platform location relative to the wire guide 57. It is further noted that the counters 88 and 89 can be preset to register the coincidence number stored in the "AND" circuit 222 slightly prior to the time for stopping the platform 41 at a desired location. In this manner, a compensation is provided for the inertia effect of the traveling platform 41 where the platform moves slightly subsequent to the operation of the stop relay 277. Specifically, counter 88 is preset to allow for the inertia effect of platform travel to the left; counter 89 is preset to allow for the inertia effect of platfrom travel to the right. Therefore, as the platform 41 is resting in a position to the right, as viewed in FIG. 1, prior to a forming operation, the counters 88 and 89 are set on a relatively low number which is slightly higher than a zero setting to compensate for the inertia effect as previously discussed. Subsequently, a number is stored in the "AND" circuit 222, wherein the number represents the distance the left end of the platform 41 is to travel to the left relative to the wire guide 57. Thereafter, the platform 41 is moved to the left and when the registered number of the counter 88 coincides with the stored number in the "AND" circuit 222, the platform 41 is stopped as previously discussed. Subsequent to transverse movement of the wire guide 57, the platform 41 will be moved to the right as viewed in FIG. 1; however, due to the previous platform movement to the left the counters 88 and 89 continue to register the relatively higher number previously selected. Hence, as the platform 41 moves to the right, the counters 88 and 89 will be operated in a reverse manner to register successively smaller numbers. Therefore, the number stored in the "AND" circuit 222 to represent the selected distance of travel of the platform 41 to the right relative to the wire guide 57 will be a lower number compared to the higher number previously stored in the "AND circuit. This pattern of initially selecting a relatively higher number for movement of the platform 41 to the left and a relatively lower number for movement of the platform to the right is continued during the entire cable harness forming operation.

Referring in FIG. 18, a plurality of normally open pushbutton switches 373, 374, 375, 376 and 377 are connected in series with the relays 332, 261, 326, 342 and 333, respectively, to facilitate manual control of the movement of the wire guide 57 to the forward center and rear positions and the skip left and skip right operations. In addition, as viewed in FIG. 16, a pair of microswitches 378 and 379 are connected in parallel and each are connected in series with the reset relay 279. The switches 378 and 379 are physically positioned at the extreme opposite ends of the travel of the platform 41 to preclude the platform traveling past an undesirable point in either direction. It is noted that when the switch 316, as viewed in FIG. 16, is opened, the apparatus will operate semi-automatically due to the removal of the contacts 311b and 278a from the stepping circuit which includes the electromagnet 253. In this manner, operation of the reset relay 279 does not provide an automatic stepping pulse as discussed in the operation of the electrical control system wherein manual control of a stepping pulse is required to initiate each phase of a wrapping cycle. In addition, when the switch 257 is opened all of the relay contacts connected in series with the electromagnet 253 are disconnetced, whereby the apparatus can be completely controlled by the operation of manual switches previously discussed.

Thus, automatic control of the electrical system, through information supplied by the punched tape 231, facilitates the operation of the wrapping and binding operations in a programmed manner, whereby the strands of the wire 31 are wrapped about the cleats 61 in a desired pattern and are thereafter bound and cut to provide the finished twin-pair cable harnesses 38 as viewed in FIG. 5. While the discussion of the operation of the apparatus disclosed the formation of a symmetrical twin-pair of harnesses 38, it is noted that the platform 41 and the wire guide 57 can be controlled through the punched tape 231 to wrap the strands of wire 31 in any desired pattern and is not limited to the patterns as shown in FIGS. 4 and 5 and as described in the operation of the electrical control system. Thus, the platform 41 could be controlled to travel a greater distance than the preceding travel to facilitate the manufacture of harnesses having selective break-outs with the strands of wire 31 of the harness being nonsymmetrical in distribution.

It is to be understood that the above-described embodiment is merely illustrative of an application of the principles of the invention and that various modifications will be apparent to those skilled in the art without departing from the principles and scope of the present invention.

What is claimed is:

1. Apparatus for forming cable harnesses including plurality of individual strands of wire drawn from a supply, which comprises:
   a support frame,
   a platform mounted for movement on the frame,
   a plurality of wire wrapping supports mounted on the platform,
   a wire guide supported for movement on the frame for receiving the strands of wire from a supply,
   means for moving the wire guide from a central position to a forward position and a position located along the path of travel of the wire guide,
   means for selectively operating the wire guide moving means so that the guide is moved in predetermined directions from the central position, and
   means for relatively and selectively controlling the movement of the platform and for controlling the operating means for the wire guide moving means so that the platform and the wire guide are moved selectively relatively whereby the strands of wire are wrapped about the selected wire wrapping supports in a pattern selected from a plurality of possible patterns.

2. The apparatus of claim 1 wherein the moving means for moving the wire guide between the center and rearward positions and for moving the guide between the center and forward positions includes:
   a pair of air cylinders mounted on the frame with a piston rod extending from each of the cylinders,
   a sheave secured rotatably to the free end of each of the piston rods,
   a pair of cords wherein one end of each cord is secured to the frame and the opposite ends of the cords are secured to a rearward side and a forward side, respectively, of the wire guide, and
   an intermediate portion of the cords wrapped partially around respective sheaves, whereby the operating means selectively controls the operation of the air cylinders to move the sheaves so that the cords are moved to move the wire guide in a desired direction.

3. The apparatus of claim 1, wherein the operating means for the wire guide moving means includes:
   a source of recorded information,
   a series of solenoid controlled valves for controlling the supply of operating pressure to the wire guide moving means, and
   means responsive to recorded information of the source for selectively operating the solenoid controlled valves whereby operating pressure is selectively applied to the wire guide moving means to move the guide in a desired direction.

4. The apparatus of claim 1, which includes:
   means for skipping the wire guide along the path of movement of the platform relative to individual wire-wrapping supports, whereby the strands of wire are distributed from one side to the opposite side of a given support, and
   means for selectively operating the skipping means to skip the wire guide over selected wire-wrapping supports.

5. The apparatus of claim 5, wherein the skipping means includes:
   a pair of parallel spaced rods supported in the frame for rocking movement,
   the wire guide supported on the rods, and
   means for rocking the rods about eccentric points of the rods at selected periods, whereby the wire guide is skipped over selected wire-wrapping supports.

6. The apparatus of claim 5, wherein the rocking means for the rods includes:
   eccentric portions extending from each of the rods,
   a pair of rocker arms secured to the eccentric extensions,
   a linking arm secured to and between the rocker arms, and
   an air cylinder having a piston rod extending therefrom with the free end of the piston rod secured to the linking arm where, upon selected operation of the air cylinder, the piston rod is moved to move the linking arm so that the rocking arms pivot the eccentric portions to rock the rods and thereby skip the wire guide.

7. The apparatus of claim 1, which includes:
   a pair of spaced parallel rods supported in the frame,
   a binding tool,
   means slidably supported on the rods for supporting the binding tool in a suspended position,
   means for selectively moving the tool supporting means, whereby the suspended tool is moved and positioned for a binding operation, and means for selectively operating the binding tool.

8. The apparatus of claim 7 wherein the binding tool supporting means includes:
 a first slide supported by, and extending between, the rods,
 a second slide supported by, and extending between, the rods,
 each of the slides formed with opposed openings coaxial with the rods,
 biasing members positioned about each of the rods with opposite ends extending into the opposed openings of the first and second slides whereby the slides are normally urged apart,
 a linkage arm pivotally secured at one end thereof to the underside of the first slide and pivotally secured at the opposite end thereof to an intermediate portion of the upper side of the binding tool, and
 a pair of spaced arms fixedly secured at one end thereof to the underside of the second slide and pivotally secured at the opposite ends thereof to opposite sides of an intermediate portion of the binding tool.

9. Apparatus for forming cable harnesses, which comprises:
 a support frame,
 a supply of strands of wire mounted on the frame,
 a platform mounted on the frame for movement,
 a plurality of supports mounted on the platform for receiving the strands partially therearound,
 means for moving the platform,
 a wire guide mounted on the frame for sliding movement, including:
 a pair of spaced parallel rods supported in the frame above, and transverse to, the platform,
 a support member mounted for sliding movement on, and extending between, the rods,
 a U-shaped guide pivotally suspended from the support member between the rods, and
 the U-shaped guide formed with a plurality of apertures in the base portion,
 means for moving the wire guide,
 a plurality of the strands of wire fed from the supply through the wire guide with the leading ends of the strands secured to one of the supports on the platform, and
 means for selectively controlling the platform and wire guide moving means, whereby the platform and wire guide are selectively moved so that the plurality of strands of wire are distributed onto the platform and wrapped partially around the supports in a predetermined pattern.

10. Apparatus for forming cable harnesses, which comprises:
 a support frame,
 a supply of strands of wire mounted on the frame,
 a platform mounted for movement on the frame,
 a plurality of supports mounted on the platform for receiving the strands partially therearound,
 means for moving the platform,
 a wire guide mounted for movement on the frame,
 the leading ends of the strands of wire being passed through the wire guide and secured to one of the platform supports,
 means for moving the wire guide transverse to the movement of the platform,
 means for skip-moving the wire guide along the path of travel of the platform,
 a source of recorded information indicative of the desired and selected movements of the platform and the wire guide,
 means for selectively operating the wire guide moving means in accordance with recorded information of the source,
 means for selectively operating the platform moving means in accordance with recorded information of the source to move the platform a selected distance, including:
 a matrix having horizontal and vertical lines to form crosspoints,
 a first group of relays having contacts connected to each crosspoint of the vertical lines,
 a second group of relays having contacts connected to each crosspoint of the horizontal lines whereby each crosspoint of the horizontal and vertical lines are connected by a pair of contacts of relays of the first and second groups, respectively,
 a third group of relays having contacts connected in parallel wherein the number of contacts corresponds to the number of horizontal lines of the matrix,
 means responsive to recorded information of the source for selectively operating one relay of each of the first, second and third groups of relays whereby a selected pattern of contacts are closed to represent the desired distance of travel of the platform,
 means for operating the platform moving means,
 means for stopping the platform, and
 means responsive to movement of the platform for connecting the selected crosspoints of the matrix with the closed contact of the third group of relays when the platform has traveled the selected distance, whereupon operating potential is applied to the stopping means to stop the platform, and
 means for selectively operating the skip-moving means in accordance with recorded information of the source.

11. Apparatus for forming cable harnesses, which comprises:
 a support frame,
 a supply of strands of wire mounted on the frame,
 a platform mounted for movement on the frame,
 means for moving the platform,
 means for selectively operating the platform moving means to move the platform selected distances at predetermined intervals,
 a plurality of supports mounted on the platform for receiving the strands partially therearound,
 a wire guide mounted for movement on the frame,
 the leading ends of the strands of wire passed through the wire guide and secured to one of the platform supports,
 means for moving the wire guide, and
 means for selectively operating the wire guide moving means at predetermined intervals other than the intervals for moving the platform, whereby the wire is distributed about the supports of the platform upon selective movement of the platform and wire guide.

12. The apparatus of claim 11 wherein the operating means for the platform moving means includes:
 means for selectively and individually storing information indicative of the desired distances of travel of the platform,
 means mechanically controlled by movement of the platform for registering the movement of the platform in terms of the information in the storing means, and
 means for stopping movement of the platform where, upon a coincidence of the stored information and the mechanically registered information, the stopping means is operated to stop the platform after traveling a preselected distance.

13. The apparatus of claim 12 wherein the storing means includes an electrical "AND" circuit having a plurality of relay contacts wherein various preselected sets of the contacts are closed to represent the desired distance of travel of the platform.

14. The apparatus of claim 12 wherein the registering means includes at least one mechanically actuated counter operated by movement of the platform to continuously register numbers where, upon the registering of a preselected number indicative of the desired distance of travel of the platform, the registered number coincides with the stored information of the storing means to operate the stopping means, whereby the platform is stopped after a preselected distance of travel.

15. Apparatus for forming cable harnesses, which comprises:
- a support frame,
- a supply of strands of wire mounted on the frame,
- a platform mounted for movement on the frame,
- a plurality of supports mounted on the platform for receiving the strands partially therearound,
- means for moving the platform,
- a wire guide mounted for movement on the frame,
- the leading ends of the strands of wire being passed through the wire guide and secured to one of the platform supports,
- means for moving the wire guide transverse to the movement of the platform,
- means for skip-moving the wire guide along the path of travel of the platform,
- a source of recorded information indicative of the desired and selected movements of the platform and the wire guide,
- means for controlling the operation of the wire guide moving means,
- means responsive to recorded information of the source for operating the wire guide controlling means whereby the wire guide is moved in a selected direction,
- means for storing information indicative of selected distances of travel of the platform,
- means responsive to recorded information of the source for selectively applying information to the storing means,
- means responsive to recorded information of the source for operating the platform moving means whereby the platform is moved in a selected direction,
- means responsive to movement of the platform for registering information indicative of the distance of travel of the platform,
- means responsive to the coincidence of the stored information and the registered information for stopping the platform moving means after the platform has traveled the selected distance,
- means responsive to recorded information of the source for skip-moving the wire guide at preselected intervals, and
- means responsive to the completion of the platform moving, wire guide moving, and wire guide skip-moving operations for selectively advancing the source of recorded information to supply information for the next succeeding operations where, upon selected movements of the platform and the wire guide, the strands of wire are distributed about the platform supports.

References Cited

UNITED STATES PATENTS

| | | | |
|---|---|---|---|
| 1,823,680 | 9/1931 | Curtiss | 140—71 |
| 1,866,250 | 7/1932 | Curtiss | 140—71 |
| 2,191,682 | 2/1940 | Reed | 140—112 |
| 2,219,887 | 11/1940 | Bowley et al. | 140—71 X |
| 2,715,922 | 8/1955 | Miloche | 140—71 |
| 3,166,104 | 1/1965 | Foley et al. | 140—71 X |

WILLIAM J. STEPHENSON, *Primary Examiner.*